US010607084B1

(12) United States Patent
Tang et al.

(10) Patent No.: US 10,607,084 B1
(45) Date of Patent: Mar. 31, 2020

(54) VISUAL INSPECTION SUPPORT USING EXTENDED REALITY

(71) Applicant: Capital One Services, LLC, McLean, VA (US)

(72) Inventors: Qiaochu Tang, The Colony, TX (US); Micah Price, Anna, TX (US); Jason Hoover, Grapevine, TX (US); Geoffrey Dagley, McKinney, TX (US); Stephen Wylie, Carrollton, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/662,676

(22) Filed: Oct. 24, 2019

(51) Int. Cl.
| | |
|---|---|
| *G06K 9/00* | (2006.01) |
| *G06T 7/70* | (2017.01) |
| *G06N 3/08* | (2006.01) |
| *G06N 3/04* | (2006.01) |
| *G06T 7/00* | (2017.01) |
| *G06T 11/00* | (2006.01) |
| *G09B 5/02* | (2006.01) |
| *G09B 19/00* | (2006.01) |
| *G06T 7/20* | (2017.01) |

(52) U.S. Cl.
CPC ........... *G06K 9/00671* (2013.01); *G06N 3/04* (2013.01); *G06N 3/08* (2013.01); *G06T 7/0002* (2013.01); *G06T 7/20* (2013.01); *G06T 7/70* (2017.01); *G06T 11/00* (2013.01); *G09B 5/02* (2013.01); *G09B 19/003* (2013.01); *G06T 2207/10016* (2013.01); *G06T 2207/20081* (2013.01); *G06T 2207/30252* (2013.01)

(58) Field of Classification Search
CPC ........ G06K 9/00671; G06N 3/04; G06N 3/08; G09B 5/02; G09B 19/003; G06T 7/0002; G06T 7/20; G06T 7/70; G06T 11/00; G06T 2207/10016; G06T 2207/20081; G06T 2207/30252
See application file for complete search history.

(56) References Cited

U.S. PATENT DOCUMENTS

| | | | |
|---|---|---|---|
| 8,443,301 B1 | 5/2013 | Easterly et al. | |
| 8,983,172 B2 | 3/2015 | Steffenson | |
| 9,092,841 B2* | 7/2015 | Silver | G06T 7/0006 |
| 9,129,158 B1* | 9/2015 | Medasani | G06K 9/00335 |

(Continued)

FOREIGN PATENT DOCUMENTS

WO 2016199171 A1 12/2016

*Primary Examiner* — Jacinta M Crawford
(74) *Attorney, Agent, or Firm* — Harrity & Harrity, LLP

(57) ABSTRACT

A device having extended reality capabilities may capture a video feed including one or more video frames depicting an object that is visible in a field of view of the device. The device may provide the one or more video frames to a machine learning model that identifies the object and one or more parts of the object that are depicted in the one or more video frames. The device may obtain positional tracking information that represents a position and an orientation associated with the object relative to a coordinate space that corresponds to the field of view of the device. The device may obtain a workflow including a sequence of content items for visually inspecting the object using the extended reality capabilities of the device. The device may render digital content associated with the workflow using the extended reality capabilities of the device.

20 Claims, 8 Drawing Sheets

(56) References Cited

U.S. PATENT DOCUMENTS

| | | | |
|---|---|---|---|
| 9,799,058 B2* | 10/2017 | Gill | G06Q 30/0278 |
| 2002/0128985 A1* | 9/2002 | Greenwald | G06Q 30/02 |
| | | | 705/400 |
| 2006/0114531 A1* | 6/2006 | Webb | G01N 21/8806 |
| | | | 359/15 |
| 2014/0072173 A1* | 3/2014 | Haas | G06T 7/74 |
| | | | 382/103 |
| 2017/0061506 A1* | 3/2017 | Dow | G06F 16/9535 |
| 2017/0124776 A1* | 5/2017 | Carpentier | G05B 23/0205 |
| 2017/0147991 A1* | 5/2017 | Franke | G06Q 10/20 |
| 2019/0095963 A1* | 3/2019 | Martin | G06Q 30/0278 |

* cited by examiner

VISUAL INSPECTION SUPPORT USING EXTENDED REALITY

BACKGROUND

"Extended reality" (XR) is an umbrella term that encompasses augmented reality (AR), mixed reality (MR), virtual reality (VR), and everything in between. For example, augmented reality generally refers to interactive technologies in which objects in a real-world environment are augmented using computer-generated virtual content that may be overlaid on the real-world environment. "Mixed reality," sometimes referred to as "hybrid reality," similarly merges real and virtual worlds to produce a visual environment in which real physical objects and virtual digital objects can co-exist. However, in addition to overlaying virtual objects on the real-world environment, mixed reality applications often anchor the virtual objects to the real-world and allow users to interact with the virtual objects. "Virtual reality" refers to fully immersive computer-generated experiences that take place in a simulated environment, often incorporating auditory, visual, haptic, and/or other feedback mechanisms.

SUMMARY

According to some implementations, a method may include capturing, by a device having extended reality capabilities, a video feed including one or more video frames depicting an object that is visible in a field of view of the device; providing, by the device, the one or more video frames to a machine learning model that identifies the object depicted in the one or more video frames and one or more parts of the object that are depicted in the one or more video frames; obtaining, by the device, positional tracking information that represents a position and an orientation associated with the object depicted in the one or more video frames relative to a coordinate space that corresponds to the field of view of the device; obtaining, by the device, a workflow including a sequence of content items for visually inspecting the object using the extended reality capabilities of the device; and rendering, by the device, digital content associated with the workflow using the extended reality capabilities of the device, wherein rendering the digital content includes: placing a first set of content items on the one or more parts of the object that are depicted in the one or more video frames based on the positional tracking information, wherein the first set of content items includes information related to one or more visually observable qualities of the one or more parts; and selecting a next set of content items to be rendered by the device based on the sequence of content items associated with the workflow and feedback related to the one or more visually observable qualities of the one or more parts.

According to some implementations, a device may include one or more memories, and one or more processors, communicatively coupled to the one or more memories, configured to: capture a video feed including one or more video frames depicting a vehicle having one or more parts that are visible in a field of view of the device; obtain positional tracking information that represents a position and an orientation associated with the vehicle depicted in the one or more video frames relative to a coordinate space that corresponds to the field of view of the device; obtain a plurality of content items for guiding a user through a visual inspection of the vehicle using extended reality capabilities of the device, wherein the plurality of content items includes a first set of content items based on one or more records in a vehicle history report that relate to one or more repair or maintenance incidents involving the vehicle, and wherein the plurality of content items further includes a second set of content items based on aggregate data that relates to one or more quality control issues impacting the vehicle; and render the plurality of content items according to a sequence defined in a workflow for guiding the user through the visual inspection of the vehicle, wherein the one or more processors, when rendering the plurality of content items, are further configured to: identify the one or more parts that are visible in the field of view of the device; determine a first subset of the plurality of content items that relate to a condition of the one or more parts that are visible in the field of view of the device; superimpose the first subset of the plurality of content items over images of the one or more parts of the vehicle on a display of the device based on the positional tracking information; and select a next subset of the plurality of content items to be rendered according to the sequence defined in the workflow based on feedback indicating that the user has finished examining the one or more parts that are visible in the field of view of the device.

According to some implementations, a non-transitory computer-readable medium may store one or more instructions. The one or more instructions, when executed by one or more processors, may cause the one or more processors to: receive a video feed including one or more video frames depicting an object that is visible in a field of view of a device having extended reality capabilities; provide the one or more video frames to a machine learning model that identifies the object depicted in the one or more video frames and one or more parts of the object that are depicted in the one or more video frames; generate a workflow for visually inspecting the object based on a machine learning model generated using historical information to determine probabilities of the one or more parts of the object being defective, wherein the workflow includes a sequence of content items for visually inspecting the object using the extended reality capabilities of the device, wherein the sequence of content items includes a first set of content items to be rendered on the one or more parts of the object that are depicted in the one or more video frames, wherein the first set of content items includes information related to one or more visually observable qualities of the one or more parts, and wherein the sequence of content items includes a second set of content items to be rendered by the device based on feedback related to the one or more visually observable qualities of the one or more parts; and provide the workflow to permit the device to render the first set of content items and/or the second set of content items.

DETAILED DESCRIPTION

Figure 1A:
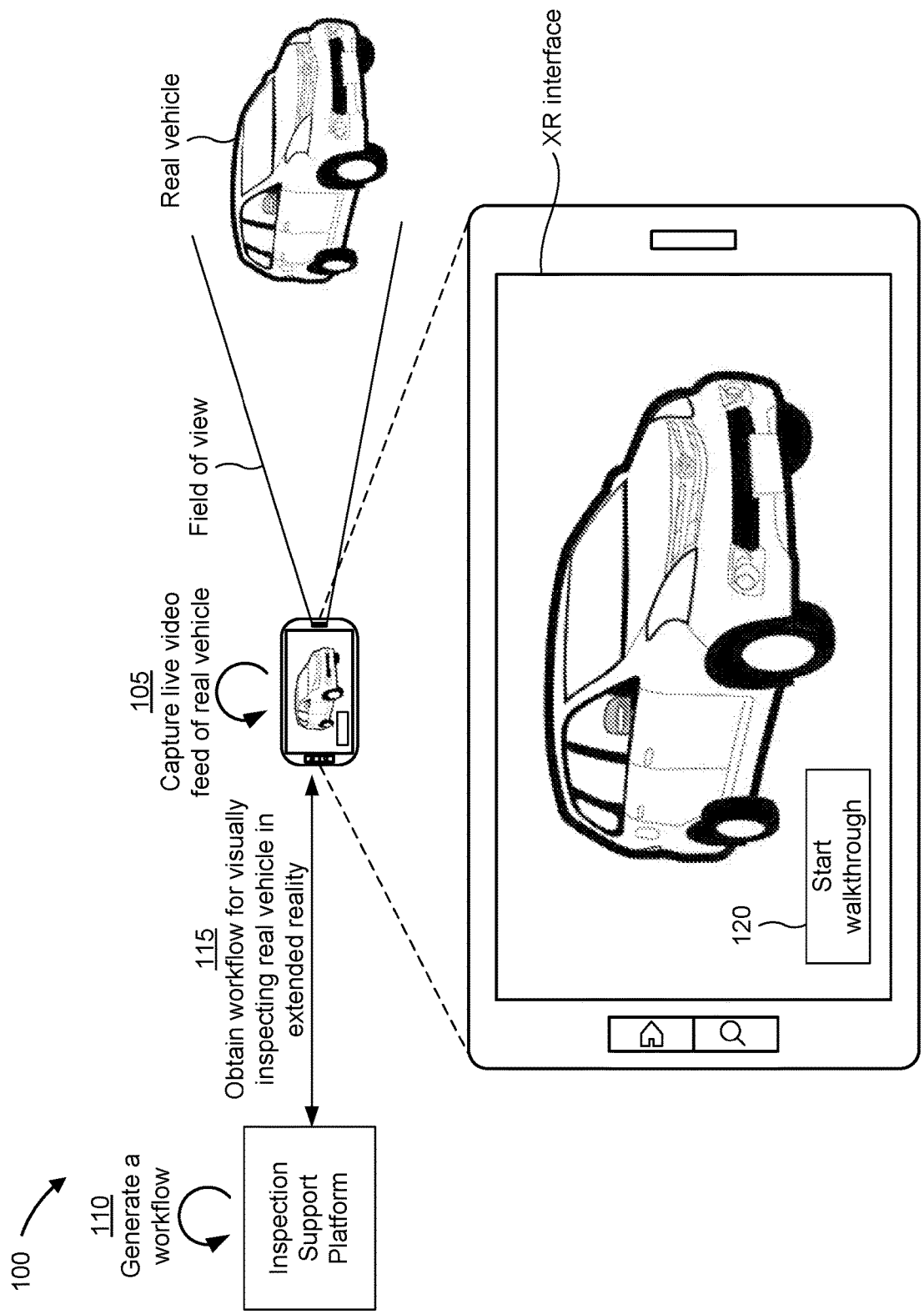
FIGS. 1A-1C are diagrams of one or more example implementations described herein.

The following detailed description of example implementations refers to the accompanying drawings. The same reference numbers in different drawings may identify the same or similar elements.

Prior to entering into a transaction for a used vehicle, a potential purchaser may wish to know a condition of the vehicle in order to make an informed decision regarding whether to purchase the vehicle, how much to pay for the vehicle, and/or the like. For example, the potential purchaser may obtain a vehicle history report that includes details relating to various items of public record, such as vehicle ownership history, accident history, odometer readings, title status (e.g., whether the vehicle has been written off as a total loss due to a collision, a fire, a flood, and/or the like causing damage in excess of the vehicle's value), past registration as a fleet vehicle, manufacturer or lemon law buybacks, and/or the like. While the vehicle history report can contain useful information to evaluate a track record for a used vehicle, in many cases the vehicle history report may be incomplete, inaccurate, and/or difficult to decipher.

More particularly, the vehicle history report is based only on information that is actually supplied to a vehicle history provider, meaning that certain information (including potential problems) that are not reported to the vehicle history provider will not be included in the vehicle history report. For example, a vehicle could be involved in a major collision, rebuilt, and sold before a database used by the vehicle history provider is updated to include notice of the collision or the subsequent repairs. In another example, certain repairs may have been carried out by an independent mechanic that did not report the repairs and/or reported the repairs only to a source inaccessible to the vehicle history provider. Furthermore, because vehicle history databases typically include information from a wide range of reporting sources (e.g., insurance companies, motor vehicle agencies, collision repair facilities, service and/or maintenance facilities, state inspection stations, manufacturers, law enforcement agencies, and/or the like), vehicle history reports may include mistakes, inconsistencies, or otherwise inaccurate data. A potential purchaser researching or investigating the mistakes, inconsistencies, and inaccurate data consumes computing resources (e.g., processing resources, memory resources, power resources, communication resources, and/or the like) and/or network resources.

Moreover, even when the vehicle history report is reasonably accurate and/or current, the vehicle history report may still be convoluted and/or unclear. For example, vehicle history reports are often replete with jargon that may be difficult to decipher for an individual without extensive automobile experience. While some vehicle history reports include summary sections to emphasize certain details in the vehicle history (e.g., red flags such as open recalls, a branded title, and/or the like), potential purchasers may have different opinions regarding which issues are most important in the vehicle history. The vehicle history report also tends to be extensive, often containing hundreds or more records, which may result in the potential purchaser having difficulty picking out important details and/or missing crucial details. Furthermore, because the records contained in the vehicle history report are based only on events that are reported to a vehicle history provider, the vehicle history report will not include information relating to the mechanical condition of the vehicle, whether certain parts are worn, whether the vehicle model includes certain components prone to early failure, and/or the like. A potential purchaser researching or investigating how to evaluate the mechanical condition of the vehicle, how to determine whether a part is worn, and whether the vehicle model includes components prone to early failure consumes computing resources (e.g., processing resources, memory resources, power resources, communication resources, and/or the like) and/or network resources.

Even though the potential purchaser may be given an opportunity to personally inspect the vehicle before deciding whether to purchase the vehicle, the potential purchaser may not know the appropriate steps to conduct a proper or thorough inspection of the vehicle and may conduct a haphazard, inefficient, and incomprehensive inspection of the vehicle. A potential purchaser researching or investigating how to perform an organized, efficient, and comprehensive inspection would consume computing resources (e.g., processing resources, memory resources, power resources, communication resources, and/or the like) and/or network resources. For example, the potential purchaser would consume significant computing resources and network resources performing online research determining which parts of the vehicle should be inspected, how to inspect the parts, what the parts should look like, which parts or systems should be more thoroughly inspected due to known problems (e.g., known manufacturing quality control problems, known early failures for a part, and/or the like).

Furthermore, the potential purchaser may want to experience features of the vehicle before deciding whether to purchase the vehicle. A potential purchaser researching or investigating (e.g., via online research) the features of the vehicle and viewing demonstrations of the features would consume computing resources (e.g., processing resources, memory resources, power resources, communication resources, and/or the like) and/or network resources. Even if the potential purchaser were permitted to perform a test drive of the vehicle to experience the features, doing so would consume fuel, increase the mileage of the vehicle, expose the vehicle to potential damage (e.g., a collision, a punctured tire, an impact from debris, and/or the like), consume a portion of the limited operational lifespan of the parts of the vehicle, and decrease the overall value of the vehicle.

Some implementations described herein may provide an inspection support platform that generates a workflow to inspect a vehicle and operates in connection with a device having extended reality capabilities (e.g., a virtual reality device, an augmented reality device, a mixed reality device, and/or the like) to render digital content to visualize information related to a condition of the vehicle, to direct a potential purchaser through the workflow to inspect the vehicle, and to demonstrate features of the vehicle.

For example, the inspection support platform may parse natural language descriptions to obtain data identifying a description of a plurality of historical inspections, outcomes of the plurality of historical inspections, information from vehicle history reports, and/or the like relating to a plurality of makes, models, and model years of vehicles, and may parse the data to identify which parts of the vehicle to be inspected are likely to be defective and/or in need of repair, and/or the like. In some implementations, the inspection support platform may determine, based on natural language processing, that a part is associated with a likelihood of being defective and/or in need of repair. Based on applying a rigorous and automated process associated with inspecting the vehicle, the inspection support platform enables recognition and/or identification of thousands or millions of data items for thousands or millions of parts, thereby increasing an accuracy and consistency of the generated workflow relative to requiring computing resources to be allocated for hundreds or thousands of technicians to manually generate a workflow based on the thousands or millions of data items.

In some implementations, the inspection support platform may generate and train a model to determine likelihoods of parts being defective and/or in need of repair using historical information relating to a plurality of historical inspections, outcomes of the plurality of historical inspections, information from vehicle history reports, and/or the like. Based on the determined likelihoods of parts being defective, the inspection support platform may generate a workflow that indicates what parts of the vehicle to inspect and in what order the parts should be inspected. In this way, computing and/or network resources may be conserved (e.g., resources that would otherwise be wasted by the potential purchaser researching or otherwise investigating which parts should be inspected and in what order).

In some implementations, the inspection support platform generates a workflow that includes a sequence of content items for the extended reality device to render to direct a potential purchaser through the inspection of the vehicle. For example, the sequence may include a step of checking the tires of the vehicle, and the inspection support platform may generate a workflow including digital content overlays to be rendered on the tires of the vehicle to highlight the tires and content (e.g., text, video, animation, and/or the like) instructing the user how to inspect the tires (e.g., for damage or wear). In this way, the extended reality device may direct a potential purchaser through an organized, efficient, and comprehensive inspection that conserves computing resources (e.g., processing resources, memory resources, power resources, communication resources, and/or the like) and/or network resources that would otherwise be consumed by the potential purchaser researching or investigating (e.g., via online research) the results of a haphazard, inefficient, and incomprehensive inspection and/or how to conduct an organized, efficient, and comprehensive inspection.

Furthermore, the inspection support platform generates a workflow specific to the parts of the vehicle, which conserves computing resources (e.g., processing resources, memory resources, power resources, communication resources, and/or the like) and/or network resources that would otherwise be consumed by the user researching which parts of the vehicle should be inspected. Additionally, or alternatively, the workflow generated by the inspection support platform includes steps that are specific to the vehicle, which conserves computing resources (e.g., processing resources, memory resources, power resources, communication resources, and/or the like) and/or network resources because the workflow is optimized to include only the necessary and/or appropriate steps for this vehicle. In some implementations, the inspection support platform may generate a dynamic workflow that changes based on information obtained during the inspection and optimizes the use of computing resources (e.g., processing resources, memory resources, power resources, communication resources, and/or the like) and/or network resources.

In some implementations, the sequence in the workflow may include a virtual demonstration of a feature or capability of the vehicle using extended reality (e.g., a virtual demonstration of driving the vehicle, a virtual demonstration of an entertainment system in the vehicle, and/or the like). In this way, the workflow generated by the inspection support platform may demonstrate a feature or capability of the vehicle using extended reality thereby conserving computing resources (e.g., processing resources, memory resources, power resources, communication resources, and/or the like) and/or network resources that would be consumed by a potential purchaser researching or investigating (e.g., via online research) the features of the vehicle and viewing demonstrations of the features. By demonstrating features or capabilities of the vehicle using extended reality, some implementations also prevent the consumption of fuel, an increase in vehicle mileage, the exposure of the vehicle to potential damage (e.g., from a collision, a punctured tire, an impact from debris, and/or the like), the consumption of a portion of the limited operational lifespan of the parts of the vehicle, and a decrease in the overall value of the vehicle that may be incurred when performing a test drive of the vehicle. Furthermore, this may also allow the potential purchaser to make an informed decision regarding whether to purchase the vehicle, how much to offer for the vehicle, and/or the like.

In some implementations, the digital content may visualize information related to one or more incidents detailed in a vehicle history report, which may be obtained based on an identifier associated with the vehicle (e.g., a vehicle identification number (VIN), a license plate number, and/or the like). For example, the vehicle history report may include one or more records related to a collision involving a rear passenger-side bumper, in which case the digital content may include an overlay placed on the rear passenger-side bumper, text hovering over the rear passenger-side bumper to indicate where the collision occurred, and/or the like. In this way, computing and/or network resources may be conserved because the potential purchaser may avoid performing research to understand items in the vehicle history report and/or the diagnostics data, and extended reality capabilities may provide the potential purchaser with the ability to visually evaluate various sources of information about the condition of the vehicle.

Furthermore, in some implementations, one or more artificial intelligence techniques, such as machine learning, deep learning, and/or the like, may be used to perform a visual inspection of the vehicle and render digital content accordingly. For example, one or more data models (e.g., machine learning models) may provide a representation of an expected visual appearance of one or more parts of the vehicle (e.g., when the one or more parts are new, after a certain level of wear-and-tear, and/or the like) and the one or more artificial intelligence techniques may be used to identify, based on the one or more images, one or more discrepancies between an actual visual appearance and the expected visual appearance of the one or more parts. Additionally, or alternatively, the one or more artificial intelligence techniques may be used to identify, based on the one or more images, one or more discrepancies between the actual visual appearance of different parts, which may indicate relative conditions of the different parts (e.g., where an engine bay includes various parts that have dust and debris built up over time from normal driving and one particular part, such as a battery, has significantly less dust and debris, this may indicate that the one particular part is newer than the various other parts). In this way, the visual inspection based on the one or more artificial intelligence techniques can detect issues that may be in need of repair or maintenance in addition to identifying parts of the vehicle that have been repaired or replaced. In this way, computing and/or network resources may be conserved (e.g., resources that would otherwise be wasted by the potential purchaser researching or otherwise investigating whether there is an issue).

In this way, the digital content may provide an extended reality (e.g., virtual reality, augmented reality, mixed reality, and/or the like) visual representation that converts text-based records contained in a vehicle history report into digital content that can be overlaid on one or more images of a vehicle in order to emphasize relevant information contained in the vehicle history report, whereas standard vehicle history reports are typically limited to text-based records that fail to provide any way to visualize the details of the reported events with reference to the associated vehicle. Furthermore, by using the one or more artificial intelligence techniques to detect issues related to the condition of the vehicle (e.g., using computer vision based on visible features of the vehicle), the extended reality visual representation may emphasize one or more potential issues related to the condition of the vehicle that may not be listed in the vehicle history report, indicate discrepancies between the vehicle history report and the actual condition of the vehicle (e.g., repairs that may have been reported but not completed or performed at a substandard level), and/or the like. In this way, the extended reality visual representation may provide a potential purchaser with more information than is otherwise available in a standard vehicle history report in addition to providing the potential purchaser with a visual tool to evaluate the information contained in the vehicle history report. In other words, some implementations described herein may use a device having extended reality capabilities to ingest data from a vehicle history report, on-board diagnostics data reported by a vehicle, data related to a visual appearance of the vehicle, and/or the like and produce an extended reality experience that provides comprehensive detail related to the condition of the vehicle and conserves computing resources (e.g., processing resources, memory resources, power resources, communication resources, and/or the like) and/or network resources that would otherwise be consumed by the potential purchaser researching, investigating, and evaluating the data.

Figure 1B:
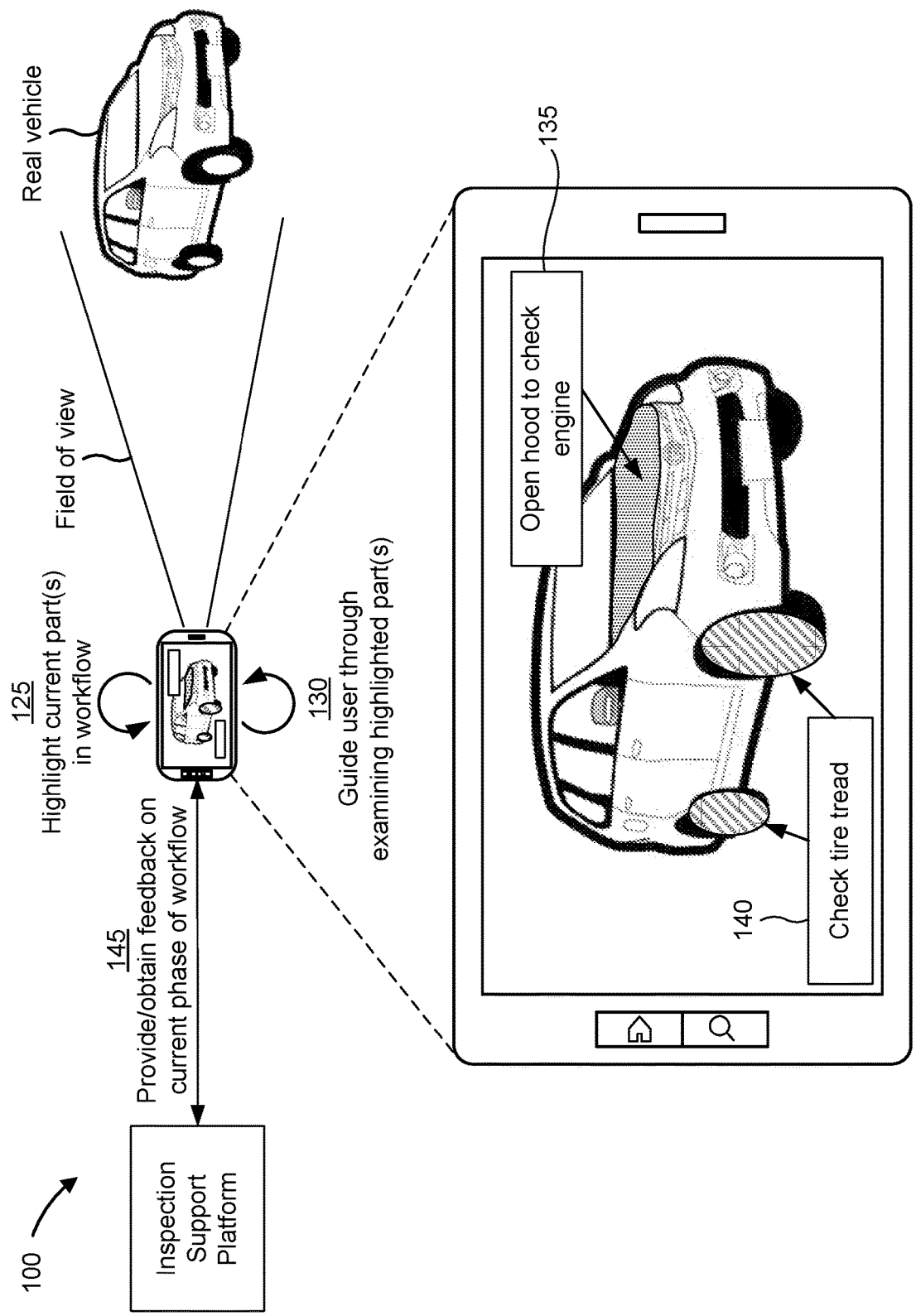
Figure 1C:
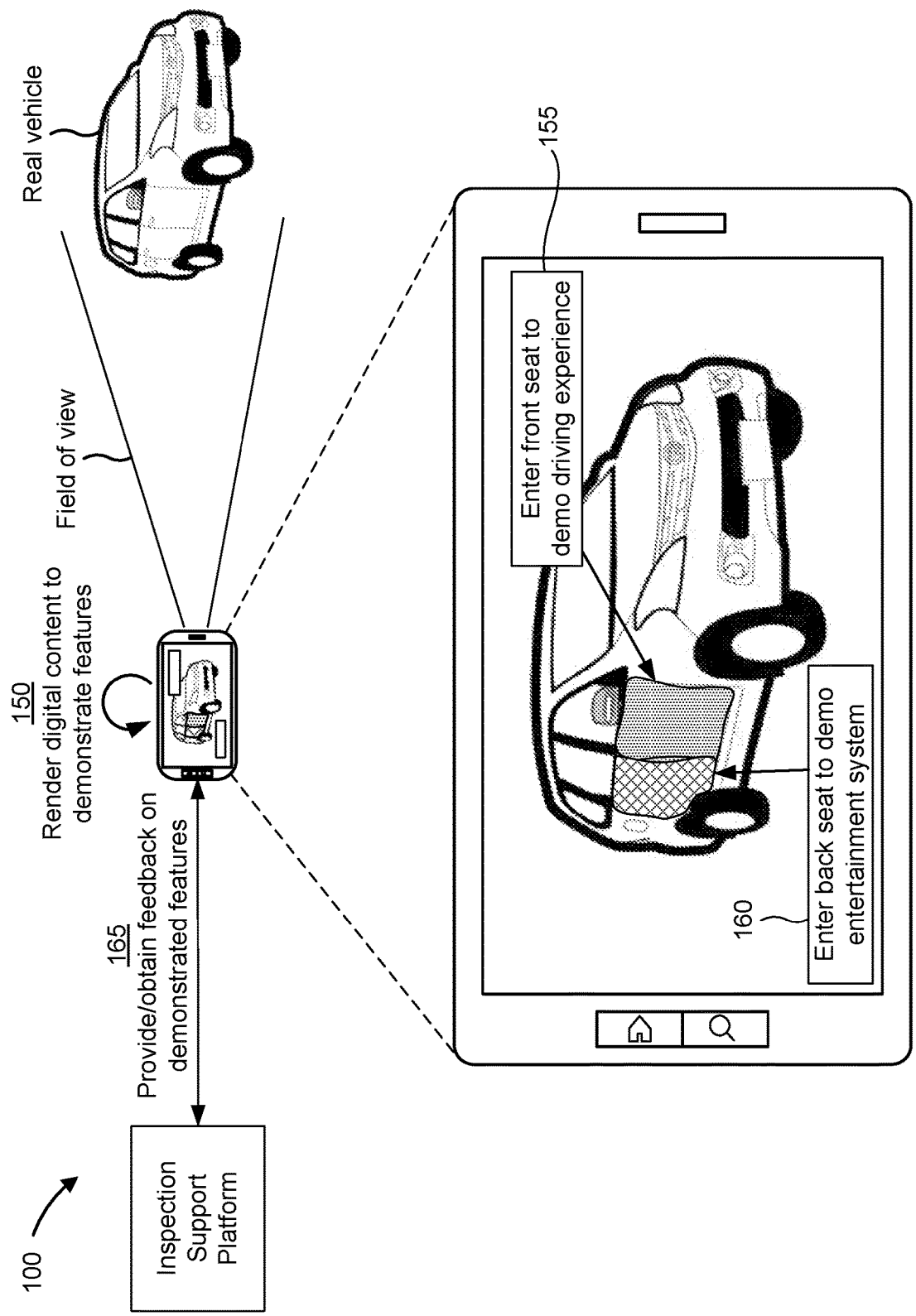

FIGS. 1A-1C are diagrams of one or more example implementations 100 described herein. As shown in FIGS. 1A-1C, example implementation(s) includes an extended reality device and an inspection support platform. In the following description, example implementation(s) 100 is described in a context that relates to visualizing information related to a vehicle history or a vehicle condition using a device having extended reality capabilities. However, it will be appreciated that this description is for illustration purposes only, and that the techniques described herein may be used to visualize information related to a history or condition of any suitable object (e.g., a house or other real estate, furniture, jewelry, electronic equipment, musical instrument, and/or the like).

In some implementations, a user (e.g., a potential purchaser, a vehicle inspector, an insurance adjuster, and/or the like) may open an application on the extended reality device (e.g., a smartphone, a tablet, and/or the like). In some implementations, the application may relate to providing a vehicle inspection service. The application may be downloaded to or pre-installed on the extended reality device. The extended reality device, when running the application, may access a camera of the extended reality device and display (e.g., on a touchscreen display) a field of view of the camera. The user may orient the extended reality device such that a vehicle (e.g., a real vehicle to be inspected) is within the field of view.

As shown in FIG. 1A, and by reference number 105, the extended reality device may capture a live video feed of the vehicle and display the video on a display (e.g., a touchscreen display) of the extended reality device. In some implementations, the extended reality device may capture the live video automatically (e.g., upon opening or running of the application on the extended reality device and without any input from the user), which conserves computing resources that might otherwise be used to process a signal or instruction to capture the live video. In some implementations, the extended reality device may capture the live video upon occurrence of a triggering event, which conserves camera resources that would otherwise be used to capture live video that will not be used (e.g., live video that is not beneficial to the vehicle inspection service). The triggering event may include receiving an instruction from the user to initiate the capturing of live video, detecting that the vehicle is located within the field of view of the camera, detecting a connection to the inspection support platform, and/or the like.

In some implementations, the extended reality device connects (e.g., through a network) to the inspection support platform. The extended reality device may connect to the inspection support platform at any time after the extended reality device opens the application. For example, the extended reality device may connect to the inspection support platform as the application is opening, after the application has opened, after the extended reality device displays the field of view of the camera, after the extended reality device detects a vehicle within the field of view of the camera, and/or the like. In some implementations, the extended reality device connects to the inspection support platform by logging into the inspection support platform using credentials, such as credentials of the user.

In some implementations, the extended reality device transmits the video feed and/or images of the vehicle to the inspection support platform for the inspection support platform to use to identify the vehicle. For example, the inspection support platform may receive the video feed and/or images, which may include an image of a vehicle identification number (VIN), an image of the license plate, an image of the make or model of the vehicle, and/or the like, and use image processing techniques (e.g., optical character recognition (OCR), computer vision, and/or the like) to identify the vehicle.

Additionally, or alternatively, the inspection support platform may use artificial intelligence techniques, such as machine learning, deep learning, and/or the like, to identify the vehicle. For example, in some implementations, the one or more artificial intelligence techniques, including machine learning, deep learning, neural networks, and/or the like may be used to identify the manufacturer, model, model year of the vehicle, and/or the like. For example, the inspection support platform may use a computer vision technique, such as a convolutional neural network technique to assist in classifying image data (e.g., image data including representations of vehicle and/or the like) into a particular class. More specifically, the inspection support platform may determine that the vehicle has a particular characteristic (e.g., a hood ornament of a particular shape, a grill badge of a particular shape, a particular body shape, a particular wheel design, and/or the like). On the other hand, the inspection support platform may determine that the vehicle does not have a particular characteristic. In some implementations, the computer vision technique may identify the vehicle depicted in the image data using an image recognition technique (e.g., an Inception framework, a ResNet framework, a Visual Geometry Group (VGG) framework, and/or the like), an object detection technique (e.g. a Single Shot Detector (SSD) framework, a You Only Look Once (YOLO) framework, and/or the like). Using the one or more artificial intelligence techniques, the inspection support platform may identify the manufacturer, model, model year of the vehicle, and/or the like.

In some implementations, the extended reality device may prompt the user to provide input identifying the vehicle. For example, the extended reality device may prompt the user to select a manufacturer, model, and/or model year of the vehicle, to input the VIN, to capture an image of the VIN, to capture an image of the license plate, and/or the like. The extended reality device may provide the prompts to the user by displaying text on a display, displaying input buttons for selecting the manufacturer, model, and/or model year of the vehicle, providing audio instructions, and/or the like. The extended reality device may receive the user input, for example, via a touchscreen, a speech-based input device (e.g., a microphone), a gesture-recognition device, and/or the like.

The extended reality device may receive the user input identifying the vehicle and process the user input. For example, the extended reality device may process a captured image of the VIN and/or the license plate using image processing techniques (e.g., optical character recognition (OCR), computer vision, and/or the like) to obtain information identifying the vehicle. The extended reality device may transmit, to the inspection support platform, information identifying the vehicle based on the user input, and the inspection support platform may receive the information identifying the vehicle.

As shown in FIG. 1A, and by reference number 110, the inspection support platform generates a workflow for inspecting the vehicle based on the information identifying the vehicle. As described herein, the inspection support platform may use one or more artificial intelligence techniques, such as machine learning, deep learning, decision trees, neural networks, and/or the like to generate a workflow that indicates what parts of the vehicle to inspect and in what order the parts should be inspected.

In some implementations, the inspection support platform may parse natural language descriptions of historical information relating to inspections of vehicles. For example, the inspection support platform may obtain data identifying, in natural language, a description of a plurality of historical inspections (e.g., makes, models, and model years of vehicles inspected, dates of the inspections, odometer readings at the time of the inspections, parts inspected during the inspections, and/or the like), outcomes of the plurality of historical inspections (e.g., parts identified as defective and/or in need of repair, conditions of parts, diagnostic data obtained from vehicle systems, recommendations and/or price estimates for repairs and/or replacement of parts, measured performance data, actual costs for repairs and/or replacement parts, and/or the like), information from vehicle history reports (e.g., repair and/or maintenance records, vehicle ownership histories, accident histories, odometer readings, title statuses, registrations as fleet vehicles, manufacturer or lemon law buybacks, open recalls, and/or the like), and/or the like (referred to hereinafter individually or in combination as historical information) relating to a plurality of makes, models, and model years of vehicles, and may parse the data to identify which parts are likely to be defective and/or in need of repair, and/or the like. The inspection support platform may obtain the historical information from one or more sources, such as a vehicle manufacturer, a government agency, a vehicle history aggregator, a vehicle repair shop, a vehicle dealer, a financial institution (e.g., a bank or a credit card issuer), a vehicle-part manufacturer, a vehicle-part merchant, a law enforcement agency, a service provider (e.g., offering access to the inspection support platform), a consumer protection agency, and/or the like. In some implementations, the inspection support platform may limit the data obtained to data specific to the make, model, and year of the vehicle to be inspected, to the make, model, and/or year of the vehicle to be inspected, to a similar make, a similar model, and/or a similar year of the vehicle to be inspected, and/or the like. By limiting the data, the inspection support platform may generate a workflow that is optimized to the vehicle to be inspected, which may make efficient use of computing resources during the inspection process.

In some implementations, the inspection support platform may determine a characteristic of a part of a vehicle based on natural language processing of the descriptions of the historical information, which may include a description of the part. For example, based on a description of a part being identified as defective or in need of repair, the inspection support platform may use natural language processing to determine that a characteristic of the part is that the part is associated with a likelihood of being defective or in need of repair. Similarly, based on a description of a part being identified as free of defects, the inspection support platform may use natural language processing to determine that a characteristic of the part is that the part is associated with a likelihood of not being defective or in need of repair. In this case, the inspection support platform may determine that a natural language text corresponds to a characteristic of a part based on data relating to other parts, data identifying characteristics of other parts, and/or the like.

In this way, the inspection support platform may identify characteristics associated with parts, as described herein. Based on applying a rigorous and automated process associated with inspecting a vehicle, the inspection support platform enables recognition and/or identification of thousands or millions of data items for thousands or millions of parts, thereby increasing an accuracy and consistency of the generated workflow relative to requiring computing resources to be allocated for hundreds or thousands of technicians to manually generate a workflow based on the thousands or millions of data items.

In some implementations, when generating the workflow, the inspection support platform may determine whether to inspect a part and in what order to inspect parts of a vehicle that is to be inspected, as described herein. For example, using the historical information, the inspection support platform may determine whether a part should be inspected and when, within the inspection process, should that part be inspected. In this case, the inspection support platform may generate a model that is to be used to generate the workflow. For example, the inspection support platform may train a model using the historical information relating to a plurality of historical inspections, outcomes of the plurality of historical inspections, information from vehicle history reports, and/or the like, to generate the workflow for the vehicle to be inspected. As an example, the inspection support platform may determine whether past inspections of a part are associated with a threshold probability of that part being a defective part for a particular make, model, and model year of vehicle. In some implementations, the inspection support platform may use a scoring system (e.g., with relatively high scores and/or relatively low scores) to identify and/or classify parts as being potentially defective or in need of repair (hereinafter "defective" will cover both defective and not yet defective but in need of repair) or potentially not being defective or in need of repair (hereinafter "defect-free" will cover both not defective and not in need of repair). In this case, the inspection support platform may determine that a relatively high score (e.g., as having a high likelihood or a high probability) is to be assigned to a part that is determined to have the same or similar characteristics of a part that has been identified as defective in historical information for the same or similar make, model, and/or year of vehicle. In contrast, the inspection support platform may determine that a relatively low score (e.g., as having a low likelihood or a low probability) is to be assigned to a part that is determined to have the same or similar characteristics of a part that has been identified as defect-free in historical information for the same or similar make, model, and/or year of vehicle.

In some implementations, the inspection support platform may obtain the historical information from one or more data structures. For example, the inspection support platform may obtain the historical information from data structures, where the information in the data structures is provided by several entities, such as vehicle manufacturers, government agencies, vehicle history aggregators, vehicle repair shops, vehicle dealers, financial institutions (e.g., banks or credit card issuers), vehicle-part manufacturers, vehicle-part merchants, law enforcement agencies, service providers (e.g., offering access to the inspection support platform via the application), consumer protection agencies, and/or the like.

In some implementations, the inspection support platform may perform a data preprocessing operation when generating the model. For example, the inspection support platform may preprocess data of the historical information to remove non-ASCII characters, white spaces, confidential data, and/or the like. In this way, the inspection support platform may organize thousands, millions, or billions of data items for machine learning and model generation.

In some implementations, the inspection support platform may perform a training operation when generating the model. For example, the inspection support platform may portion data of the historical information into a training set (e.g., a set of data to train the model), a validation set (e.g., a set of data used to evaluate a fit of the model and/or to fine tune the model), a test set (e.g., a set of data used to evaluate a final fit of the model), and/or the like. In some implementations, the inspection support platform may preprocess and/or perform dimensionality reduction to reduce the data of the historical information to a minimum feature set. In some implementations, the inspection support platform may train the model on this minimum feature set, thereby reducing processing to train the machine learning model, and may apply a classification technique, to the minimum feature set.

In some implementations, the inspection support platform may use a classification technique, such as a logistic regression classification technique, a random forest classification technique, a gradient boosting machine learning (GBM) technique, and/or the like, to determine a categorical outcome (e.g., that a part has a high likelihood of being defective, that a part has a low likelihood of being defective, and/or the like). Additionally, or alternatively, the inspection support platform may use a naïve Bayesian classifier technique. In this case, the inspection support platform may perform binary recursive partitioning to split the data of the minimum feature set into partitions and/or branches and use the partitions and/or branches to perform predictions (e.g., that the part has a high or low likelihood of being defective). Based on using recursive partitioning, the inspection support platform may reduce utilization of computing resources relative to manual, linear sorting and analysis of data items, thereby enabling use of thousands, millions, or billions of data items to train a model, which may result in a more accurate model than using fewer data items.

Additionally, or alternatively, the inspection support platform may use a support vector machine (SVM) classifier technique to generate a non-linear boundary between data items in the training set. In this case, the non-linear boundary is used to classify test data (e.g., data relating to characteristics of a part) into a particular class (e.g., a class indicating that the part has a high likelihood of being defective, a class indicating that the part has a low likelihood of being defective, and/or the like).

Additionally, or alternatively, where the test data includes image data, video data, and/or the like, the inspection support platform may use a computer vision technique, such as a convolutional neural network technique to assist in classifying test data (e.g., data relating a characteristic of a part) into a particular class (e.g., a class indicating that the part has a high likelihood of being defective, a class indicating that the part has a low likelihood of being defective, and/or the like). In some cases, the computer vision technique may include using an image recognition technique (e.g., an Inception framework, a ResNet framework, a Visual Geometry Group (VGG) framework, and/or the like), an object detection technique (e.g. a Single Shot Detector (SSD) framework, a You Only Look Once (YOLO) framework, and/or the like), an object in motion technique (e.g., an optical flow framework and/or the like), and/or the like.

Additionally, or alternatively, the inspection support platform may train the model that is to be used to generate the workflow using a supervised training procedure that includes receiving input to the model from a subject matter expert, which may reduce an amount of time, an amount of processing resources, and/or the like to train the model relative to an unsupervised training procedure. In some implementations, the inspection support platform may use one or more other model training techniques, such as a neural network technique, a latent semantic indexing technique, and/or the like. For example, the inspection support platform may perform an artificial neural network processing technique (e.g., using a two-layer feedforward neural network architecture, a three-layer feedforward neural network architecture, and/or the like) to perform pattern recognition with regard to patterns of whether characteristics of parts described using different semantic descriptions can be used to determine whether the parts have high or low likelihoods of being defective. In this case, using the artificial neural network processing technique may improve an accuracy of a model (e.g., the model that is to be used to generate the workflow) generated by the inspection support platform by being more robust to noisy, imprecise, or incomplete data, and by enabling the inspection support platform to detect patterns and/or trends undetectable to human analysts or systems using less complex techniques.

As another example, the inspection support platform may determine, using a linear regression technique, that a threshold percentage of characteristics, in a set of characteristics, do not assist in a determination of whether a part has a high or low likelihood of being defective, and may determine that those characteristics are to receive relatively low association scores. In contrast, the inspection support platform may determine that another threshold percentage of characteristics do assist in a determination of whether a part has a high or low likelihood of being defective and may assign a relatively high association score to those characteristics. Based on the characteristics that do and/or do not assist in a determination of whether a part has a high or low likelihood of being defective, the inspection support platform may generate the model that is to be used to generate the workflow and may use the model for analyzing new characteristics, and/or the like) that the inspection support platform identifies.

In some implementations, a different device, such as a server device, may generate and train the model. The different device may send the model for use by the inspection support platform. The different device may update and send (e.g., on a scheduled basis, on an on-demand basis, on a triggered basis, on a periodic basis, and/or the like) the model to the inspection support platform.

Accordingly, the inspection support platform may use any number of artificial intelligence techniques, machine learning techniques, deep learning techniques, and/or the like to generate a workflow that indicates what parts of the vehicle to inspect and in what order the parts should be inspected. For example, the inspection support platform may generate the workflow to include a sequence in which a part that has a highest likelihood of being defective is inspected first, a part that has a second highest likelihood of being defective is inspected second, and so on until all parts with likelihoods that satisfy a threshold are inspected.

In some implementations, the inspection support platform may use one or more artificial intelligence techniques, machine learning techniques, deep learning techniques, and/or the like to determine a likelihood or probability of a part being defective for the parts of the vehicle to be inspected. For each part having a likelihood of being defective that satisfies a threshold, the inspection support platform may analyze historical repair data to determine a cost for repairing or replacing the part. In some implementations, the inspection support platform may determine the cost for repairing or replacing a part by analyzing historical repair data in one or more data structures accessible to the inspection support platform. In some implementations, the inspection support platform may determine the cost for repairing or replacing a part by training a model to estimate the cost using, for example, the historical information relating to the plurality of historical inspections and/or the outcomes of the plurality of historical inspections. This model may be trained in a manner similar to the model that is used to predict the likelihood or probability of parts being defective. The inspection support platform may restrict the historical repair data analyzed based on a model of the vehicle, a location of the vehicle (e.g., analyze repair data for repairs performed in the same state and/or city as the vehicle, analyze repair data for repairs performed less than a given distance from the location of the vehicle, and/or the like), a time period (e.g., analyze repair data for repairs performed in the last two years, and/or the like), and/or the like. The inspection support platform may determine a cost for repairing or replacing the part based on a mean, a median, a mode, and/or another mathematical analysis.

In some implementations, for each part having a likelihood of being defective that satisfies a threshold, the inspection support platform may generate a score as a function of the likelihood of the part being defective and the determined cost of repairing or replacing the part. The inspection support platform may generate the workflow based on the scores for the parts of the vehicle.

In some implementations, the inspection support platform may generate the workflow for inspecting the vehicle such that the workflow inspects parts in an order based on the scores. For example, the inspection support platform may generate the workflow to include a sequence where a part having a highest score is inspected first, a part having a second highest score second is inspected second, and so on until each part having a likelihood of being defective that satisfies the threshold has been inspected.

In some implementations, the inspection support platform may generate a workflow that inspects the part having a highest score first and then inspects other parts located on the vehicle near the part having the highest score. For example, if an engine part has the highest score, the inspection support platform may generate a workflow that inspects that engine part first and then inspects all of the other parts in the engine bay of the vehicle that have a likelihood of being defective that satisfies the threshold. In some implementations, the inspection support platform may generate a workflow that inspects the part having a highest score first and then inspects other parts in one direction from the part having the highest score (e.g., from the front of the vehicle to the back of the vehicle, from the back of the vehicle to the front of the vehicle, clockwise around the vehicle, counterclockwise around the vehicle, and/or the like).

In some implementations, the inspection support platform may obtain aggregated data regarding similar vehicles (e.g., same manufacturer, same model, same model year, same feature package, same color, same class of vehicle, and/or the like) gathered regarding the visually observable characteristics of one or more parts and generate the workflow based on the aggregated data. For example, the inspection support platform may obtain data gathered by other users while inspecting other vehicles using another extended reality device in connection with the inspection support platform. Based on the aggregated data, the inspection support platform may include one or more steps in the generated workflow to inspect one or more parts of the vehicle.

Several examples of how a workflow may be generated by the inspection support platform are given above. These are intended merely as examples of factors that may be used to determine which part to inspect and/or in what order to inspect parts of a vehicle. In some implementations, other factors or combinations of factors may be used by the inspection support platform to generate a workflow.

In this way, the inspection support platform generates a workflow that directs the user through an organized, efficient, and comprehensive inspection that conserves computing resources (e.g., processing resources, memory resources, power resources, communication resources, and/or the like) and/or network resources that would otherwise be consumed by the user researching or investigating (e.g., via online research) the results of a haphazard, inefficient, and incomprehensive inspection and/or how to conduct an organized, efficient, and comprehensive inspection. Additionally, or alternatively, the workflow generated by the inspection support platform is specific to the parts of the vehicle, which conserves computing resources (e.g., processing resources, memory resources, power resources, communication resources, and/or the like) and/or network resources that would otherwise be consumed by the user researching which parts of the vehicle should be inspected. Additionally, or alternatively, the workflow generated by the inspection support platform includes steps that are specific to the vehicle to be inspected, which conserves computing resources (e.g., processing resources, memory resources, power resources, communication resources, and/or the like) and/or network resources because the workflow is optimized to include only the necessary and/or appropriate steps for this vehicle.

In some implementations, the inspection support platform may generate a dynamic workflow that changes based on information obtained during the inspection. For example, the dynamic workflow may eliminate, skip, insert, and/or add one or more later steps in the inspection process after receiving information gathered during one or more earlier steps in the inspection process. In this way, the dynamic workflow may optimize the use of computing resources (e.g., processing resources, memory resources, power resources, communication resources, and/or the like) and/or network resources.

As shown in FIG. 1A, and by reference number 115, the extended reality device may obtain the workflow for visually inspecting the vehicle in extended reality from the inspection support platform (e.g., the inspection support platform may transmit the workflow to the extended reality device, and the extended reality device may receive the workflow).

In some implementations, the extended reality device automatically obtains the workflow from the inspection support platform after the inspection support platform generates the workflow. In some implementations, the extended reality device may provide a prompt to the user and obtain the workflow from the inspection support platform after receiving input from the user. For example, the extended reality device may render a virtual button with the text "Download Inspection Workflow," and, based on the user pressing the virtual button, the extended reality device may obtain the workflow from the inspection support platform.

Additionally, or alternatively, the extended reality device may display information identifying the manufacturer, model, and/or model year of the vehicle before, during, or after obtaining the workflow from the inspection support platform. For example, the extended reality device may display information identifying the manufacturer, model, and/or model year of the vehicle at the same time as a prompt requesting user input to begin obtaining the workflow from the inspection support platform.

In some implementations, the workflow may include a sequence of content items which, when rendered by the extended reality device, direct a user through steps for inspecting the vehicle. The content items may include patterned overlays, colored overlays, holograms, digital or virtual objects, text boxes, visual markers, superimposed graphics, and/or the like, as described elsewhere herein. The inspection support platform may include content items that help the user locate a part to be inspected (e.g., a patterned overlay, a colored overlay, and/or the like identifying the part). Additionally, or alternatively, the inspection support platform may include content items that instruct the user how to inspect a part (e.g., a string of text-based instructions, a video clip demonstrating how to inspect the part, and/or the like). In some implementations, the inspection support platform may include content items requesting input from the user regarding a step in the workflow (e.g., virtual buttons for selecting an observed condition of a part, a menu for selecting a brand of a part, and/or the like).

As shown in FIG. 1A, and by reference number 120, the extended reality device may render a virtual button for receiving user input to initiate the workflow. In some implementations, the extended reality device may prompt the user to initiate the workflow with an auditory prompt (e.g., via a speaker), such as a recorded voice asking if the user is ready to begin and/or the like. The extended reality device may receive user input, for example, via a touchscreen, a speech-based input device (e.g., a microphone), a gesture-recognition device, and/or the like. In some implementations, the extended reality device may automatically initiate the workflow after obtaining the workflow from the inspection support platform.

As shown in FIG. 1B, and by reference number 125, the extended reality device may highlight the part(s) of the vehicle currently being inspected in the workflow by, for example, rendering digital content (e.g., a patterned overlay, a colored overlay, and/or the like) identifying the part(s) to be inspected. In some implementations, the extended reality device and/or the inspection support platform may identify one or more anchor points for rendering digital content based on the video feed corresponding to the vehicle. More particularly, the extended reality device may have or otherwise be associated with a coordinate space that corresponds to the field of view of the extended reality device, and digital content (e.g., virtual objects) may be rendered within the coordinate space according to a pose of the extended reality device. For example, the pose of the extended reality device may be expressed according to six degrees of freedom, which include a three-dimensional position of the extended reality device combined with pitch, roll, and yaw representing an orientation through rotation about three perpendicular axes. Accordingly, the one or more anchor points may represent a relative position and orientation of one or more corresponding points in the field of view of the extended reality device for a particular frame, and a pose of the one or more anchor points within the coordinate space may be automatically updated based on changes to the pose of the extended reality device.

In some implementations, the one or more anchor points may be identified based on one or more parts of the vehicle that are depicted in image data from the video feed. Accordingly, the extended reality device and/or the inspection support platform may be configured to use one or more artificial intelligence techniques, such as machine learning, deep learning, and/or the like, to identify the one or more parts of the real-world vehicle that are depicted in the image data. For example, in some implementations, the one or more artificial intelligence techniques may include a computer vision technique, such as a convolutional neural network technique, to assist in classifying the image data (e.g., data relating to distinctive feature points in the image data) into a particular class (e.g., a class indicating that the feature points share a planar surface and therefore belong to a common part). In some cases, the computer vision technique may identify the one or more parts depicted in the image data using an image recognition technique (e.g., an Inception framework, a ResNet framework, a Visual Geometry Group (VGG) framework, and/or the like), an object detection technique (e.g. a Single Shot Detector (SSD) framework, a You Only Look Once (YOLO) framework, and/or the like), an object in motion technique (e.g., an optical flow framework and/or the like), an image segmentation technique, and/or the like.

Accordingly, using the one or more artificial intelligence techniques, the extended reality device and/or the inspection support platform may identify one or more parts of the vehicle based on the image data corresponding to the vehicle. For example, as shown in FIG. 1B, the parts of the vehicle depicted in the image data may include a front bumper, front headlights, a hood, a windshield, a fender, passenger-side tires, passenger-side doors, a passenger-side mirror, a gas cap, a quarter panel, and/or the like. Furthermore, using the one or more artificial intelligence techniques, the extended reality device and/or the inspection support platform may identify any suitable interior and/or exterior part of the vehicle.

For example, the hood of the vehicle may be opened to reveal an engine bay, and the extended reality device may analyze image data corresponding to the engine bay to identify an intake manifold, a battery, an alternator, various fluid compartments, and/or the like. In another example, image data may be obtained from within the vehicle, and the extended reality device and/or the inspection support platform may analyze the image data to identify an instrument panel, an infotainment system, floor pedals, a steering wheel, a glove compartment, and/or the like. In some implementations, the extended reality device and/or the inspection support platform may obtain one or more virtual models of the vehicle (e.g., schematics based on a make, model, and/or year of the vehicle), which may be used to identify the one or more parts of the vehicle using the one or more artificial intelligence techniques.

Again, as shown in FIG. 1B, and by reference number 125, the extended reality device may render digital content highlighting one or more parts currently of interest in the workflow. For example, as mentioned above, the extended reality device may identify the one or more anchor points to represent the one or more parts of the vehicle depicted in the image data as trackable objects in the coordinate space corresponding to the field of view of the extended reality device. Accordingly, when rendering the digital content, the digital content may be placed within the coordinate space using the one or more anchor points that correspond to the one or more parts of the vehicle. In this way, when the pose of the extended reality device changes, the relative position and orientation of the one or more anchor points may remain fixed to the one or more parts. For example, as shown in FIG. 1B, the digital content includes a first patterned overlay placed on the hood and a second patterned overlay placed on the passenger-side tires.

As further shown in FIG. 1B, and by reference number 130, the extended reality device may guide the user through an examination of highlighted parts. In some implementations, the extended reality device may guide the user by providing audio instructions, rendering digital content, and/or the like. Additionally, or alternatively, the extended reality device and/or the inspection support platform may automatically examine the parts using one or more artificial intelligence techniques and/or one or more virtual models of the vehicle and/or parts of the vehicle as described below, such that the extended reality device guides the user through the examination by providing instructions to the user for adjusting the position and orientation of the extended reality device with respect to the vehicle and/or for manipulating parts of the vehicle (e.g., open the driver-side door, open the hood, lower the tailgate, and/or the like).

For example, as shown by reference number 135 in FIG. 1B, the digital content may include an instruction in a text box to open the hood to check the engine. Using artificial intelligence techniques to analyze the image data from the video feed, the extended reality device may identify, in the field of view, a mechanism that releases a hood latch, and direct the user via audio instructions (e.g., a voice saying, "Push the highlighted mechanism upward") and/or rendered digital content (e.g., a patterned overlay on the mechanism) to manipulate the mechanism and release the hood latch. The extended reality device, upon determining that the hood is open (e.g., via image analysis identifying one or more parts of the engine in the field of view, based on feedback from the user, and/or the like), may perform an automated visual inspection of each of the parts within the field of view using the one or more artificial intelligence techniques.

In some implementations, the inspection support platform may use any number of artificial intelligence techniques, machine learning techniques, deep learning techniques, and/or the like to generate one or more virtual models that represent the expected appearance of one or more parts of the vehicle. Furthermore, in some implementations, the extended reality device may provide image data related to the vehicle to the inspection support platform for determining the condition of one or more parts depicted therein based on the one or more virtual models and/or locally process the vehicle image data using the one or more virtual models in combination with one or more artificial intelligence techniques.

The extended reality device may render digital content on the display of the extended reality device based on one or more discrepancies in the appearance of one or more parts depicted in the image data, which may be detected using the one or more artificial intelligence techniques and the one or more virtual models representing the expected appearance of the one or more parts depicted in the image data. The extended reality device may obtain image data corresponding to an exterior of the vehicle, an interior of the vehicle, an undercarriage of the vehicle, an engine bay of the vehicle, and/or the like, and the one or more virtual models may be used in combination with the one or more artificial intelligence techniques to detect one or more discrepancies that relate to a condition of the vehicle based on the image data.

For example, in some implementations, the one or more virtual models may be used in combination with the one or more artificial intelligence techniques to detect that one or more parts depicted in the image data appear to be newer than other parts of the vehicle, which may indicate that the one or more parts appear to have been repaired or replaced, that the other parts appear worn down and may need repair or maintenance, and/or the like. In another example, the one or more virtual models may be used in combination with the one or more artificial intelligence techniques to detect aftermarket modifications to the vehicle (e.g., that the vehicle has a turbocharger, aftermarket stereo equipment, custom trim, and/or the like).

In this way, the one or more virtual models of the vehicle and/or parts of the vehicle and the one or more artificial intelligence techniques may be used to inspect a condition of the vehicle and potentially detect one or more issues related to the condition of the vehicle that are not listed in a vehicle history report, not indicated in diagnostic data provided by the vehicle, and/or the like. For example, where various parts in the engine bay are covered in dust and debris that typically accumulate over time from normal driving but an intake manifold has substantially less dust and debris than the other parts, this may indicate that the intake manifold was replaced. In another example, the visual inspection performed using the one or more artificial intelligence techniques may be used to detect issues related to improper service (e.g., an incompatible battery could be detected based on the image data indicating that the battery is the wrong size or otherwise differs from the expected visual appearance).

In a further example, as shown by reference number 140 in FIG. 1B, the extended reality device may render digital content instructing the user to check the tire tread. Using artificial intelligence techniques to analyze the image data from the video feed, the extended reality device may identify, in the field of view, one or more of the tires and perform an automated visual inspection of each of the tires within the field of view using the one or more artificial intelligence techniques. In some implementations, the extended reality device may render digital content instructing the user to orient the extended reality device to change the field of view and capture a video feed of a particular part and/or a particular portion of a part of the vehicle (e.g., a prompt or audio instruction to check the passenger-side rear tire, a prompt to hold the extended reality device a few inches above the tire tread, and/or the like).

In some implementations, the extended reality device may render digital content to provide the user with instructions to inspect the tires. For example, the digital content may include a video demonstrating how to inspect the tires, such as a video including demonstrations of each step in the process of inspecting the tires. Additionally, or alternatively, the digital content may include text or audio providing step-by-step instructions to the user for inspecting the tires.

Accordingly, in this way, analyzing the vehicle image data using the one or more virtual models of the vehicle and/or parts of the vehicle and the one or more artificial intelligence techniques may be used to perform a visual inspection of the vehicle that may reveal various potential issues relating to the condition of the vehicle. In this way, by using computer vision based on visible features of the vehicle, issues that may not be listed in a vehicle history report, indicated in vehicle diagnostics data, and/or the like may be revealed, discrepancies between the vehicle history report, the diagnostics data, and the actual condition of the vehicle may be detected, and/or the like. In this way, computing and/or network resources may be conserved because the user may avoid performing research to understand items in the vehicle history report and/or the diagnostics data, and extended reality capabilities may provide the user with the ability to visually evaluate various sources of information about the condition of the vehicle. This may also provide the user with information to enable a well-informed decision regarding whether to purchase the vehicle, how much to offer for the vehicle, and/or the like.

Furthermore, in addition to enabling the user to make an informed decision regarding a potential purchase by enabling the user to understand the vehicle history and identify possible omissions in the vehicle history, these techniques may also be useful for financial service providers, vehicle dealers, and/or the like. For example, a financial service provider may ingest this information to adjust one or more loan terms (e.g., a loan amount that may affect pricing) to minimize risk. Similarly, vehicle dealers could also use this information to identify discrepancies with respect to a trade-in and adjust the offered value for the trade-in.

In some implementations, after rendering digital content such as a prompt to open the hood and check the engine (see reference number 135 in FIG. 1B) or a prompt to check the tire tread (see reference number 140 in FIG. 1B), the extended reality device may receive feedback (e.g., user input, one or more images of one or more parts of the vehicle, and/or the like) related to one or more visually observable qualities of the one or more parts. The extended reality device may process the received feedback, for example, by processing user input to determine the condition of a part, processing an image of a part of the vehicle using artificial intelligence techniques to determine the condition of the part, and/or the like.

As shown in FIG. 1B, and by reference number 145, the extended reality device may transmit information based on the processed feedback to the inspection support platform. Additionally, or alternatively, the extended reality device may transmit the received feedback to the inspection support platform, and the inspection support platform may process the received feedback, for example, by processing the user input to determine the condition of a part, processing an image of a part of the vehicle using artificial intelligence techniques to determine the condition of the part, and/or the like. In some implementations, the inspection support platform may select a second set of content items to be rendered in extended reality based on the processed feedback and transmit the second set of content items to the extended reality device.

The extended reality device may render the second set of content items on the display using the extended reality capabilities of the extended reality device, continue rendering content items in accordance with the sequence established by the workflow, and continue transmitting information based on the feedback to the inspection support platform until the workflow is complete. In some implementations, during the workflow and/or upon completion of the workflow, the extended reality device may render content items providing information to the user regarding results of the visual inspection, where the results are based on the feedback related to one or more visually observable qualities of the one or more parts.

By way of example, the extended reality device may render digital content including an instruction in a text box to check the tire tread (e.g., as shown by reference number 140) for the front passenger-side tire and then render digital content including text instructing the user to select the condition of the tire tread and images of tire tread (e.g., images of tire tread of the specific model of tire being inspected) in excellent, good, fair, and poor conditions as input buttons for selection by the user. The extended reality device may receive the selection of condition of the tire tread for the front passenger-side tire.

The extended reality device may render digital content in the same manner (e.g., an instruction in a text box to check the tire tread, text instructing the user to select the condition of the tire tread, and images of tire tread in excellent, good, fair, and poor conditions as input buttons for selection by the user) for the other tires on the vehicle and receive the selections of the conditions of the tire treads for the other tires on the vehicle. The extended reality device may transmit information indicating the conditions of the tire treads to the inspection support platform (e.g., as shown by reference number 145).

The inspection support platform may process the information indicating the conditions of the tire treads and transmit an updated workflow, to the extended reality device, based on the information indicating the conditions of the tire treads. For example, if the information indicated that one tire has a tread in poor condition but the other three tires have treads in good condition, the inspection support platform may process the information and update the workflow, based on the feedback regarding the tire tread conditions, to include a next step of checking the tire pressure for each of the tires because the tire with poor-conditioned tread may have low pressure or the wheel may be out of alignment. For example, the updated workflow may include a next set of digital content items including an instruction in a text box to check the pressure of the tires. Thus, by providing and/or obtaining feedback during the workflow, the extended reality device and the inspection support platform may assist a user in investigating potential problems, defects, needed repairs, and/or the like based on visually observable qualities of one or more parts on the vehicle. In this way, the dynamic workflow may optimize the use of computing resources (e.g., processing resources, memory resources, power resources, communication resources, and/or the like) and/or network resources.

As shown in FIG. 1C, and by reference number 150, the extended reality device may render digital content from a workflow to demonstrate features of the vehicle. In some implementations, the extended reality device may obtain the workflow and/or information for demonstrating features of the vehicle from the vehicle via a machine-to-machine communication interface between the extended reality device and the vehicle. For example, the extended reality device may connect to the vehicle via a wireless connection (e.g., Bluetooth, Wi-Fi, and/or the like) and/or a wired connection (e.g., USB, one or more on-board diagnostics (OBD) interfaces (e.g., an OBD-II interface), and/or the like). The manufacturer of the vehicle may provide the workflow and/or information for demonstrating features of the vehicle by storing data representative of the workflow and/or the information on memory within the vehicle for an extended reality device to obtain via the machine-to-machine communication interface.

Additionally, or alternatively, the extended reality device may obtain information (e.g., information identifying the vehicle, digital content demonstrating one or more features of the vehicle, and/or the like) from the vehicle, which the extended reality device provides to the inspection support platform. In some implementations, the inspection support platform may generate a workflow based on the information obtained from the vehicle. For example, the extended reality device may obtain a video demonstrating an entertainment system from the vehicle via the machine-to-machine communication interface and provide the video to the inspection support platform. The inspection support platform may generate a workflow that includes the video.

In some implementations, the extended reality device may capture a live video feed of the vehicle and render digital content from the workflow based on image data in the video feed. For example, the workflow may include a sequence of content items including a virtual demonstration of one or more features and/or capabilities of one or more parts of the vehicle depicted in the video feed. In some implementations, the workflow may include digital content including one or more prompts to guide a user through a demonstration of features of the vehicle.

For example, as shown in FIG. 1C and by reference number 155, the extended reality device may render an overlay on the front, passenger-side door of the vehicle and a text box prompting the user to enter the front seat to demo a driving experience. Based on feedback indicating that the demonstration of a driving experience should be initiated (e.g., input from the user (e.g., the user touching a rendered button on a touchscreen, a verbal instruction to the extended reality device from the user, detection, by the extended reality device, of a gesture performed by the user, and/or the like), image analysis indicating that the user has entered the front seat with the extended reality device, and/or the like), the extended reality device may render digital content demonstrating a driving experience for the user. For example, the extended reality device may render digital content including one or more scenes in window areas of the vehicle to appear as if the vehicle is moving down a road, highway, dirt trail, beach, and/or the like.

Additionally, or alternatively, the extended reality device may render digital content including simulations demonstrating the appearance of an instrument panel, gauges, lights, an infotainment system, floor pedals, a steering wheel, buttons, displays, and/or the like. For example, the extended reality device may render digital content including a scene depicting another vehicle stopping in front of the vehicle and a warning system feature of the vehicle alerting the user to the stopping vehicle. Additionally, or alternatively, the extended reality device may generate audio features of the vehicle, such as beeping from a warning system, speech prompts from one or more systems in the vehicle, and/or the like.

As shown in FIG. 1C, and by reference number 160, the extended reality device may render an overlay on the rear, passenger-side door of the vehicle and a text box prompting the user to enter the back seat to demo an entertainment system. Based on feedback indicating that the demonstration of the entertainment system should be initiated (e.g., input from the user (e.g., the user touching a rendered button on a touchscreen, a verbal instruction to the extended reality device from the user, detection, by the extended reality device, of a gesture performed by the user, and/or the like), image analysis indicating that the user has entered the rear seat with the extended reality device, and/or the like), the extended reality device may render digital content demonstrating the entertainment system for the user. For example, if the entertainment system includes one or more screens, the extended reality device may render digital content overlays on the screen demonstrating a menu of the entertainment system (e.g., an interactive menu that may receive feedback from the user and/or the like), a video feed (e.g., a movie, a television show, a video game, and/or the like), and/or the like. Additionally, or alternatively, the extended reality device may generate audio during the demonstration of the entertainment system and/or other features of the vehicle, such as music, audio associated with a video feed, speech prompts from the entertainment system and/or other features of the vehicle, and/or the like.

In some implementations, the extended reality device may render interactive digital content to demonstrate one or more features and/or capabilities associated with the vehicle. For example, the extended reality device may render a screen simulation of a control menu associated with the entertainment system and receive input from a user (e.g., a selection of a menu item via a touch on a touchscreen, speech-based input (e.g., a verbal instruction, a verbal selection, and/or the like), a gesture performed by the user, and/or the like). Based on the received input, the extended reality device may demonstrate a response of the entertainment system to the received input. The extended reality device may demonstrate the response by increasing a volume of audio, changing playback of a video (e.g., pausing the video, starting the video, rewinding the video, fast-forwarding the video, and/or the like), switching from a first type of entertainment to a second type of entertainment (e.g., video to audio), switching from a first type of source to a second type of source (e.g., radio to compact disc), rendering the screen simulation of the control menu to display a new menu (e.g., a submenu and/or the like), and/or the like. The extended reality device may render content to demonstrate features of the vehicle as well as the response of systems within the vehicle to user input.

In this way, computing and/or network resources may be conserved because the user may avoid researching or investigating (e.g., via online research) the features of the vehicle and viewing demonstrations of the features. Furthermore, performing a test drive of the vehicle to experience the features would consume fuel, increase the mileage of the vehicle, expose the vehicle to potential damage (e.g., a collision, a punctured tire, an impact from debris, and/or the like), consume a portion of the limited operational lifespan of the parts of the vehicle, and decrease the overall value of the vehicle.

In some implementations, the extended reality device may receive feedback from the user (e.g., feedback regarding the one or more demonstrated features). For example, the extended reality device may render digital content including a prompt requesting that the user rate the one or more demonstrated features, a prompt requesting that the user indicate whether the user likes the one or more demonstrated features, and/or the like.

As shown in FIG. 1C, and by reference number 165, the extended reality device may provide and/or obtain, from the inspection support platform, feedback on the one or more demonstrated features of the vehicle. Additionally, or alternatively, the extended reality device may provide, to the inspection support platform, information such as user selection of a feature for demonstration, user location within the vehicle, an orientation of the extended reality device relative to the exterior and/or interior of the vehicle, completion of a step of and/or the entirety of a demonstration of a feature, and/or the like.

In some implementations, the extended reality device may obtain a workflow for troubleshooting one or more issues associated with the vehicle (e.g., one or more issues reported by owners of similar vehicles, one or more issues that owners of similar vehicles frequently seek to resolve via an internet search, one or more issues that are regularly difficult to solve in all vehicles, one or more problems related to an operational state of the vehicle, and/or the like). The inspection support platform may generate the workflow for troubleshooting one or more issues associated with the vehicle based on vehicle history reports, based on aggregated data regarding similar vehicles (e.g., same manufacturer, same model, same model year, same feature package, same color, same class of vehicle, and/or the like), and/or the like. In some implementations, the inspection support platform may generate the workflow for troubleshooting one or more issues associated with the vehicle based on information obtained via a machine-to-machine communication interface with the vehicle. Additionally, or alternatively, the extended reality device may obtain a workflow for troubleshooting one or more issues associated with the vehicle via a machine-to-machine communication interface between the extended reality device and the vehicle.

In some implementations, the workflow for troubleshooting one or more issues associated with the vehicle may include a sequence of content items that includes prompts and overlays instructing the user through steps to solve a problem. For example, the workflow may include a sequence of content items instructing the user through a process to manually disable a rear-door lock, check the oil level in the vehicle, test and/or replace light bulbs in the vehicle, replace a fuse in the vehicle, and/or the like. In this way, computing and/or network resources may be conserved because the user may avoid performing research to determine how to troubleshoot one or more issues associated with the vehicle.

In some implementations, the inspection support platform may generate a workflow including a sequence of content items, where the sequence of content items includes a first subset of the content items associated with inspecting the vehicle, a second subset of the content items associated with demonstrating one or more features of the vehicle, and/or a third subset of content items associated with troubleshooting one or more issues associated with the vehicle. In other words, the workflow may include content items that, when rendered by the extended reality device, direct the user through an inspection of the vehicle, demonstrate one or more features of the vehicle to the user, and/or direct the user through troubleshooting one or more issues associated with the vehicle. The inspection support platform may generate the workflow in a manner similar to that described above.

In some implementations, after completing the workflow, the inspection support platform and/or the extended reality device may automatically perform one or more actions (e.g., based on information regarding the vehicle obtained during the inspection, based on user feedback on the one or more demonstrated features of the vehicle, and/or the like). For example, the one or more actions may include recommending an estimated value of the vehicle based on results of an inspection of the vehicle (e.g., number of and/or cost of repairing defective parts, odometer reading, condition of the vehicle, and/or the like), aggregated pricing data for similar vehicles (e.g., same manufacturer, same model, same model year, same feature package, same color, same class of vehicle, and/or the like), the location of the vehicle, and/or the like. In this way, computing and/or network resources may be conserved because the user may avoid performing research to determine an estimated value of the vehicle based on results of the inspection of the vehicle.

In some implementations, the inspection support platform and/or the extended reality device may automatically generate an estimate for repairing the vehicle. For example, the inspection support platform and/or the extended reality device may automatically estimate the cost for repairing or replacing one or more parts identified as being defective and/or in need of replacement during the inspection by analyzing historical repair data, historical information relating to the plurality of historical inspections, and/or outcomes of the plurality of historical inspections. Additionally, or alternatively, the inspection support platform and/or the extended reality device may automatically generate a list of repair shops (e.g., less than a given distance from the location of the vehicle), make an appointment (e.g., based on a calendar accessible to the extended reality device) to repair or replace one or more parts identified as being defective and/or in need of replacement during the inspection, and/or the like. In this way, computing and/or network resources may be conserved because the user may avoid performing research to determine an estimate for repairing the vehicle, identify repair shops near the vehicle, and schedule an appointment.

In some implementations, the inspection support platform and/or the extended reality device may automatically generate a contract for sale or lease of the vehicle by the user (e.g., based on information regarding the user (e.g., credit history), based on an automatically generated estimated value, and/or the like). For example, the inspection support platform and/or the extended reality device may have access to personal information, such as name, address, telephone number, credit history, and/or the like, of the user stored in a remote data structure, stored on the extended reality device (e.g., when the user owns the extended reality device), and/or the like. Based on the personal information, the inspection support platform and/or the extended reality device may automatically generate a contract for sale or lease of the vehicle with terms specific to the user. In this way, computing and/or network resources may be conserved because the seller of the vehicle may avoid requesting the credit history of the user and researching other personal information of the user.

In some implementations, the inspection support platform and/or the extended reality device may automatically apply for a loan to purchase the vehicle based on information regarding the user, such as name, address, telephone number, and/or the like, which may be stored in a remote data structure, stored on the extended reality device (e.g., when the user owns the extended reality device), and/or the like. In this way, computing and/or network resources may be conserved because the user may avoid performing research to identify loan providers, accessing online applications of the loan providers, and completing the online applications for transmission to the loan providers.

In some implementations, the inspection support platform and/or the extended reality device may automatically transfer funds for the user to purchase the vehicle. For example, the inspection support platform and/or the extended reality device may connect to a mobile banking application on the extended reality device and transfer funds (e.g., from a savings account to a checking account, from an account owned by the user to an account owned by the seller, and/or the like).

In some implementations, the inspection support platform and/or the extended reality device may automatically generate a quote and/or an offer for car insurance for the vehicle. For example, based on the results of the inspection of the vehicle, information regarding the user (e.g., historical accident reports, age, and/or the like), aggregated data regarding the vehicle and/or similar vehicles, and/or the like, the inspection support platform and/or the extended reality device may obtain one or more quotes and/or offers for car insurance from one or more insurance companies. In this way, computing and/or network resources may be conserved because the user may avoid performing research to car insurance providers, accessing online applications of the insurance providers, and completing the online application for transmission to the insurance providers.

In this way, the inspection support platform and/or the extended reality device may generate an extended reality visual representation to direct the user through a sequence of steps to obtain additional information regarding the vehicle despite the user lacking the knowledge necessary to conduct an appropriate inspection. The extended reality visual representation may also provide the user with information to enable a well-informed decision regarding whether to purchase the vehicle, how much to offer for the vehicle, and/or the like.

Furthermore, in addition to enabling the user to make an informed decision regarding a potential purchase by enabling the user to understand the vehicle history and identify possible omissions in the vehicle history, these techniques may also be useful for financial service providers, vehicle dealers, and/or the like. For example, a financial service provider may ingest this information to adjust one or more loan terms (e.g., a loan amount that may affect pricing) to minimize risk. Similarly, vehicle dealers could also use this information to identify discrepancies with respect to a trade-in and adjust the offered value for the trade-in.

As indicated above, FIGS. 1A-1C are provided as one or more examples. Other examples may differ from what is described with regard to FIGS. 1A-1C. For example, there may be additional devices and/or networks, fewer devices and/or networks, different devices and/or networks, or differently arranged devices and/or networks than those shown in FIGS. 1A-1C. Furthermore, two or more devices shown in FIGS. 1A-1C may be implemented within a single device, or a single device shown in FIGS. 1A-1C may be implemented as multiple and/or distributed devices. Additionally, or alternatively, a set of devices (e.g., one or more devices) of example implementation(s) 100 may perform one or more functions described as being performed by another set of devices of example implementation(s) 100. For example, any or every operation described herein as being performed by the inspection support platform may be performed by the extended reality device, and vice versa. By way of further example, any or every operation described herein as being performed by the inspection support platform and/or the extended reality device may be performed by the extended reality device alone in some implementations.

Figure 2:
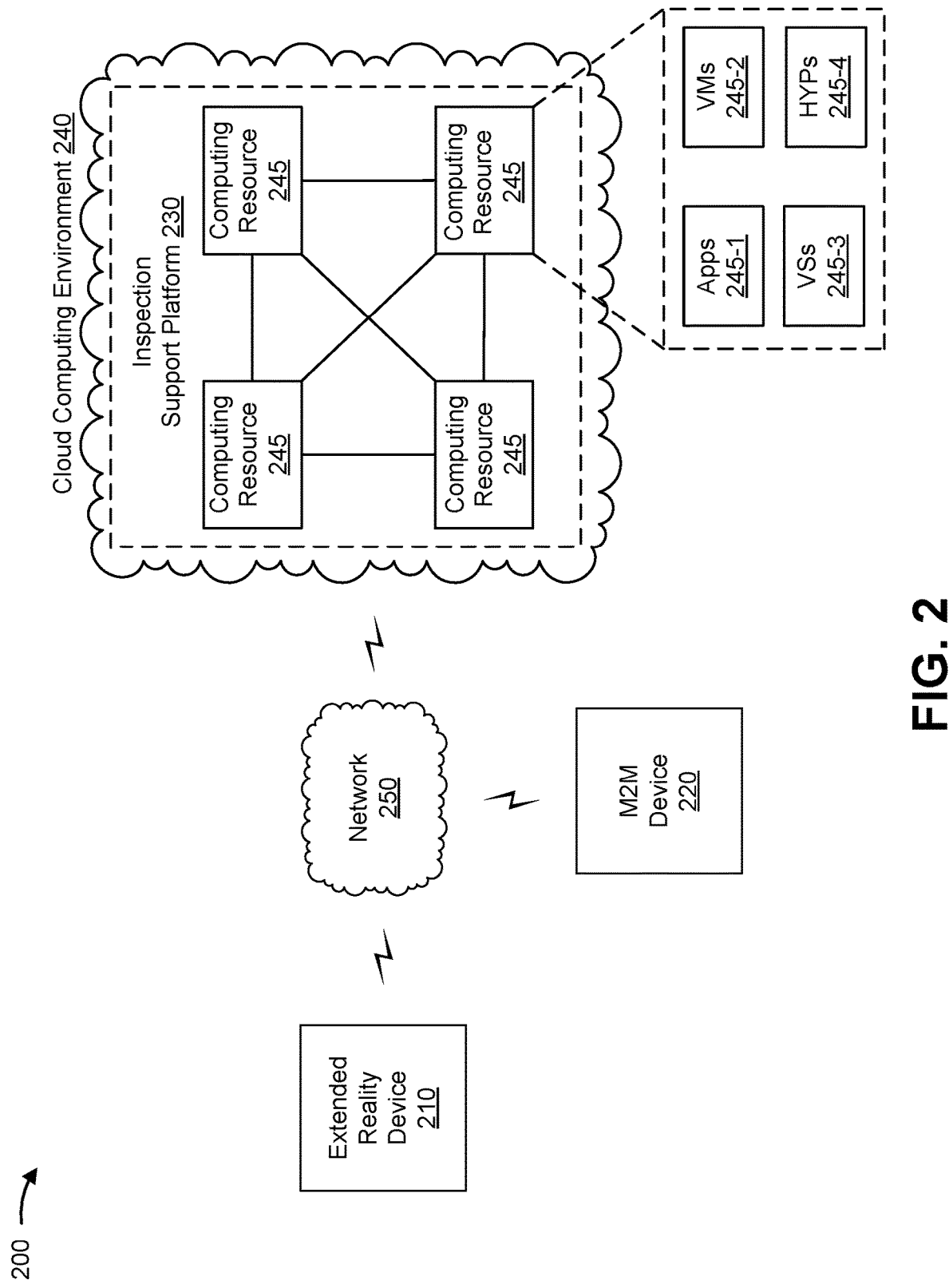
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include an extended reality device 210, a machine-to-machine (M2M) device 220, an inspection support platform 230, a cloud computing environment 240 with a computing resource 245, and a network 250. Devices of environment 200 may interconnect via wired connections, wireless connections, or a combination of wired and wireless connections.

Extended reality device 210 includes one or more devices capable of receiving, generating, storing, processing, displaying, and/or providing information associated with a condition of one or more vehicles, as described herein. For example, extended reality device 210 may be a device having augmented reality and/or mixed reality capabilities, such as an optical see-through display device, a video see-through display device, a holographic display device, a heads-up display device, a smartphone, a tablet computer, a handheld computer, and/or the like. Additionally, or alternatively, extended reality device 210 may be a virtual reality device, such as a virtual reality headset, a head-mounted display device, and/or the like. Extended reality device 210 includes one or more display devices capable of rendering digital content in combination with one or more images of a vehicle to represent information related to a condition of the vehicle. For example, in some implementations, the one or more display devices may include technologies such as liquid crystal display (LCDs) devices, light-emitting diode (LED) display devices, plasma display devices, wearable display devices (e.g., head-mounted display devices), handheld display devices, stereoscopic or three-dimensional display devices, and/or the like. In some implementations, extended reality device 210 may include one or more sensors. The one or more sensors may include a camera, an image sensor, an infrared camera, a laser sensor, and/or any other suitable sensor(s) that may capture one or more images and/or data related to physical attributes of an object.

M2M device 220 includes one or more devices capable of receiving, generating, storing, processing, and/or providing information, such as information described herein. In some implementations, M2M device 220 may include a device integrated within a vehicle (e.g., a car, a truck, a motorcycle, a bus, a boat, farm equipment, construction equipment, and/or the like). For example, M2M device 220 may include an in-vehicle infotainment (IVI) system, an in-car entertainment (ICE) system, a telematics device, a Global Positioning System (GPS) device, an electronic control module (ECM), an on-board diagnostics (OBD) device, and/or a similar type of device. In some implementations, M2M device 220 may include a device that is separate from but associated with a vehicle, such as a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, M2M device 220 may receive information from and/or transmit information to extended reality device 210 and/or inspection support platform 230, as described herein.

Inspection support platform 230 includes one or more computing resources assigned to receiving, generating, storing, processing, and/or providing information related to a condition of one or more vehicles, information related to a workflow including a sequence of content items for visually inspecting one or more vehicles, and/or information related to a workflow including a sequence of content items for demonstrating features and/or capabilities of one or more vehicles. For example, inspection support platform 230 may be a platform implemented by cloud computing environment 240 that may receive, generate, store, process, and/or provide information related to one or more vehicle history reports, diagnostic data associated with one or more vehicles, data models for representing an expected visual appearance of one or more vehicle parts, digital content for visualizing information related to a condition of one or more vehicles, digital content for instructing a user to inspect one or more vehicles, digital content for demonstrating features and/or capabilities of one or more vehicles, and/or the like. In some implementations, inspection support platform 230 is implemented by computing resources 245 of cloud computing environment 240.

Inspection support platform 230 may include a server device or a group of server devices. In some implementations, inspection support platform 230 may be hosted in cloud computing environment 240. Notably, while implementations described herein describe inspection support platform 230 as being hosted in cloud computing environment 240, in some implementations, inspection support platform 230 may be non-cloud-based or may be partially cloud-based.

Cloud computing environment 240 includes an environment that delivers computing as a service, whereby shared resources, services, etc. may be provided to extended reality device 210 and/or M2M device 220. Cloud computing environment 240 may provide computation, software, data access, storage, and/or other services that do not require end-user knowledge of a physical location and configuration of a system and/or a device that delivers the services. As shown, cloud computing environment 240 may include inspection support platform 230 and computing resource 245.

Computing resource 245 includes one or more personal computers, workstation computers, server devices, or another type of computation and/or communication device. In some implementations, computing resource 245 may host inspection support platform 230. The cloud resources may include compute instances executing in computing resource 245, storage devices provided in computing resource 245, data transfer devices provided by computing resource 245, etc. In some implementations, computing resource 245 may communicate with other computing resources 245 via wired connections, wireless connections, or a combination of wired and wireless connections.

As further shown in FIG. 2, computing resource 245 may include a group of cloud resources, such as one or more applications ("APPs") 245-1, one or more virtual machines ("VMs") 245-2, virtualized storage ("VSs") 245-3, one or more hypervisors ("HYPs") 245-4, or the like.

Application 245-1 includes one or more software applications that may be provided to or accessed by extended reality device 210 and/or M2M device 220. Application 245-1 may eliminate a need to install and execute the software applications on extended reality device 210 and/or M2M device 220. For example, application 245-1 may include software associated with inspection support platform 230 and/or any other software capable of being provided via cloud computing environment 240. In some implementations, one application 245-1 may send and/or receive information to and/or from one or more other applications 245-1, via virtual machine 245-2.

Virtual machine 245-2 includes a software implementation of a machine (e.g., a computer) that executes programs like a physical machine. Virtual machine 245-2 may be either a system virtual machine or a process virtual machine, depending upon use and degree of correspondence to any real machine by virtual machine 245-2. A system virtual machine may provide a complete system platform that supports execution of a complete operating system ("OS"). A process virtual machine may execute a single program and may support a single process. In some implementations, virtual machine 245-2 may execute on behalf of a user (e.g., extended reality device 210 and/or M2M device 220), and may manage infrastructure of cloud computing environment 240, such as data management, synchronization, or long-duration data transfers.

Virtualized storage 245-3 includes one or more storage systems and/or one or more devices that use virtualization techniques within the storage systems or devices of computing resource 245. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 245-4 provides hardware virtualization techniques that allow multiple operating systems (e.g., "guest operating systems") to execute concurrently on a host computer, such as computing resource 245. Hypervisor 245-4 may present a virtual operating platform to the guest operating systems and may manage the execution of the guest operating systems. Multiple instances of a variety of operating systems may share virtualized hardware resources.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
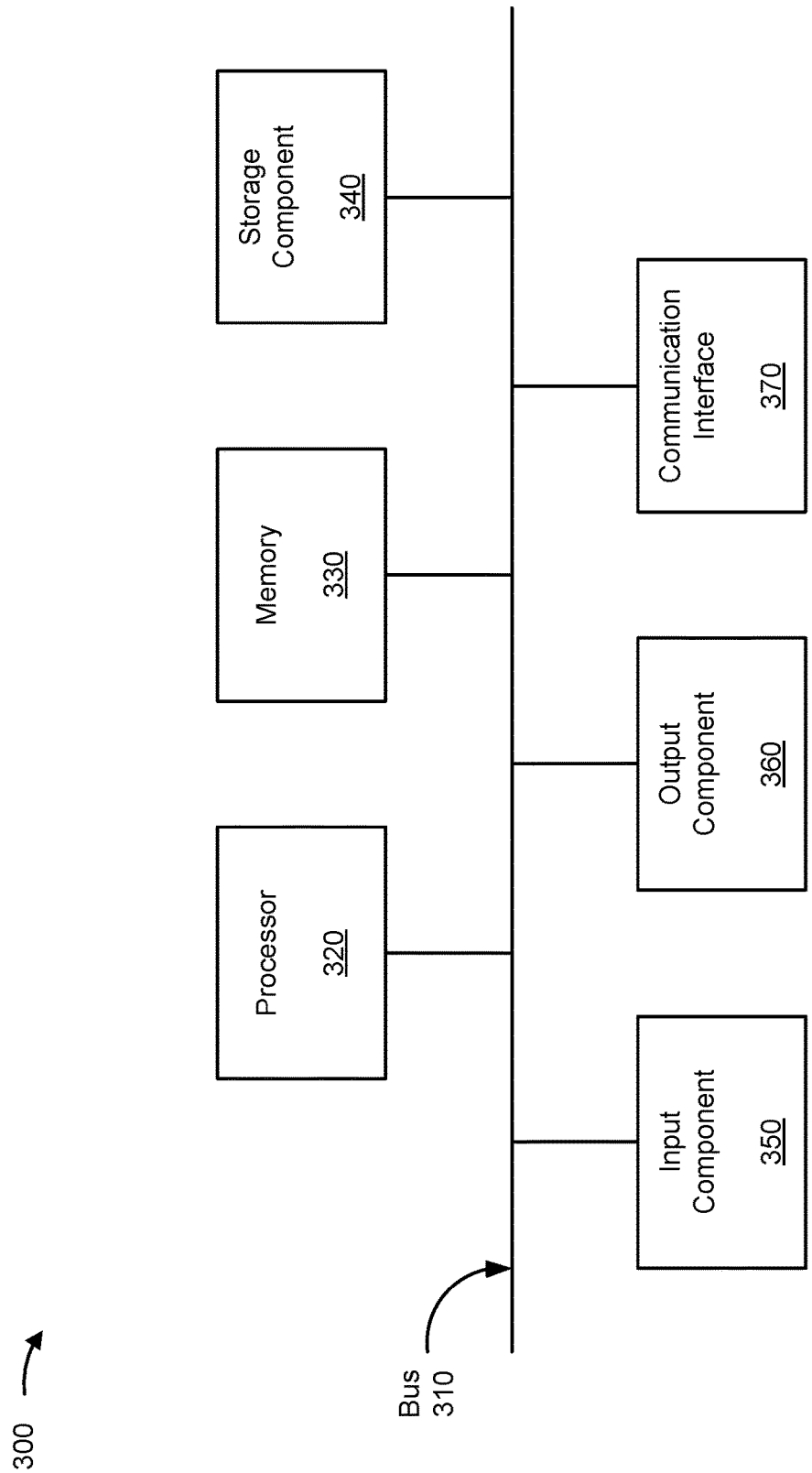
FIG. 3 is a diagram of example components of one or more devices of FIG. 2.

FIG. 3 is a diagram of example components of a device 300. Device 300 may correspond to extended reality device 210, M2M device 220, and/or inspection support platform 230. In some implementations, extended reality device 210, M2M device 220, and/or inspection support platform 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
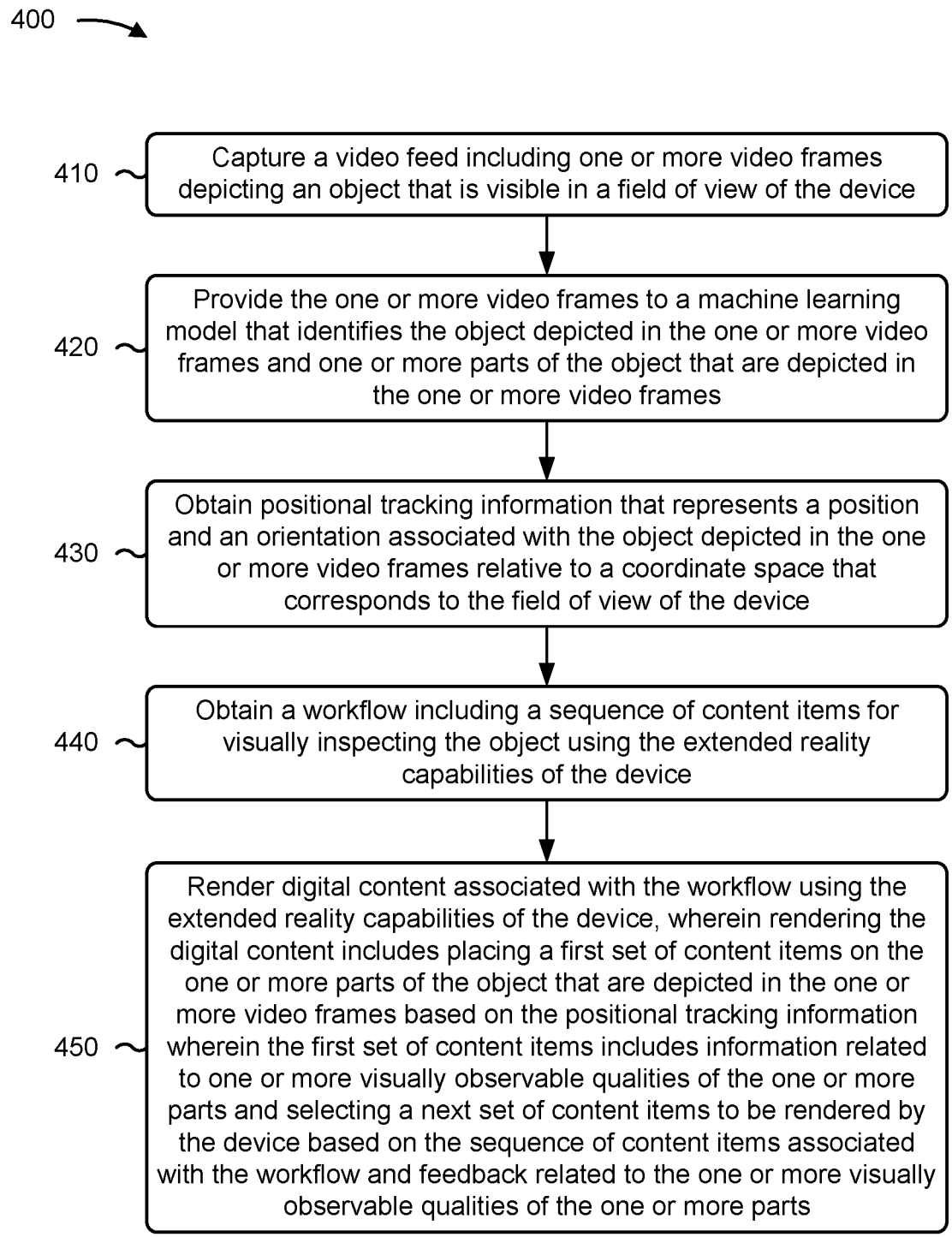
FIGS. 4-6 are flow charts of example processes for visual inspection support using extended reality.

FIG. 4 is a flowchart of an example process 400 for visual inspection support using extended reality. In some implementations, one or more process blocks of FIG. 4 may be performed by an extended reality device (e.g., extended reality device 210). In some implementations, one or more process blocks of FIG. 4 may be performed by another device or a group of devices separate from or including the extended reality device, such as a machine-to-machine device (e.g., M2M 220), an inspection support platform (e.g., inspection support platform 230), and/or the like.

As shown in FIG. 4, process 400 may include capturing a video feed including one or more video frames depicting an object that is visible in a field of view of the device (block 410). For example, the extended reality device (e.g., using processor 320, memory 330, storage component 340, input component 350, output component 360, communication interface 370 and/or the like) may capture a video feed including one or more video frames depicting an object that is visible in a field of view of the device, as described above.

As further shown in FIG. 4, process 400 may include providing the one or more video frames to a machine learning model that identifies the object depicted in the one or more video frames and one or more parts of the object that are depicted in the one or more video frames (block 420). For example, the extended reality device (e.g., using processor 320, memory 330, storage component 340, input component 350, output component 360, communication interface 370 and/or the like) may provide the one or more video frames to a machine learning model that identifies the object depicted in the one or more video frames and one or more parts of the object that are depicted in the one or more video frames, as described above.

As further shown in FIG. 4, process 400 may include obtaining positional tracking information that represents a position and an orientation associated with the object depicted in the one or more video frames relative to a coordinate space that corresponds to the field of view of the device (block 430). For example, the extended reality device (e.g., using processor 320, memory 330, storage component 340, input component 350, output component 360, communication interface 370 and/or the like) may obtain positional tracking information that represents a position and an orientation associated with the object depicted in the one or more video frames relative to a coordinate space that corresponds to the field of view of the device, as described above.

As further shown in FIG. 4, process 400 may include obtaining a workflow including a sequence of content items for visually inspecting the object using the extended reality capabilities of the device (block 440). For example, the extended reality device (e.g., using processor 320, memory 330, storage component 340, input component 350, output component 360, communication interface 370 and/or the like) may obtain a workflow including a sequence of content items for visually inspecting the object using the extended reality capabilities of the device, as described above.

As further shown in FIG. 4, process 400 may include rendering digital content associated with the workflow using the extended reality capabilities of the device, wherein rendering the digital content includes placing a first set of content items on the one or more parts of the object that are depicted in the one or more video frames based on the positional tracking information wherein the first set of content items includes information related to one or more visually observable qualities of the one or more parts and selecting a next set of content items to be rendered by the device based on the sequence of content items associated with the workflow and feedback related to the one or more visually observable qualities of the one or more parts (block 450). For example, the extended reality device (e.g., using processor 320, memory 330, storage component 340, input component 350, output component 360, communication interface 370 and/or the like) may render digital content associated with the workflow using the extended reality capabilities of the extended reality device by placing a first set of content items on the one or more parts of the object that are depicted in the one or more video frames based on the positional tracking information, as described above. In some implementations, the first set of content items includes information related to one or more visually observable qualities of the one or more parts and selecting a next set of content items to be rendered by the device based on the sequence of content items associated with the workflow and feedback related to the one or more visually observable qualities of the one or more parts.

Process 400 may include additional implementations, such as any single implementation or any combination of implementations described below and/or in connection with one or more other processes described elsewhere herein.

In a first implementation, the first set of content items include two-dimensional overlays to be placed over images of the one or more parts of the object that are depicted in the one or more video frames based on the positional tracking information.

In a second implementation, alone or in combination with the first implementation, the sequence of content items included in the workflow is based on one or more records in a report that relates to a condition of the object.

In a third implementation, alone or in combination with one or more of the first and second implementations, the sequence of content items included in the workflow is based on aggregate data relating to one or more quality control issues associated with a group of objects of which the object is a member.

In a fourth implementation, alone or in combination with one or more of the first through third implementations, the sequence of content items included in the workflow includes technical support for troubleshooting one or more issues associated with the object.

In a fifth implementation, alone or in combination with one or more of the first through fourth implementations, the sequence of content items included in the workflow includes a virtual demonstration of one or more features or capabilities associated with the object.

In a sixth implementation, alone or in combination with one or more of the first through fifth implementations, the first set of content items includes a first prompt to examine the one or more visually observable qualities of the one or more parts, and the next set of content items to be rendered by the device includes a second prompt to examine a condition of a different part of the object based on the feedback including a response to the first prompt indicating that the one or more parts are in an acceptable operating condition.

In a seventh implementation, alone or in combination with one or more of the first through sixth implementations, the first set of content items includes a prompt to capture one or more images depicting the one or more visually observable qualities of the one or more parts, and the next set of content items to be rendered by the device indicates a condition of the one or more parts based on the feedback including the one or more images depicting the one or more visually observable qualities of the one or more parts.

In an eighth implementation, alone or in combination with one or more of the first through seventh implementations, the workflow including the sequence of content items for visually inspecting the object is obtained via a machine-to-machine communication interface between the device and the object.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
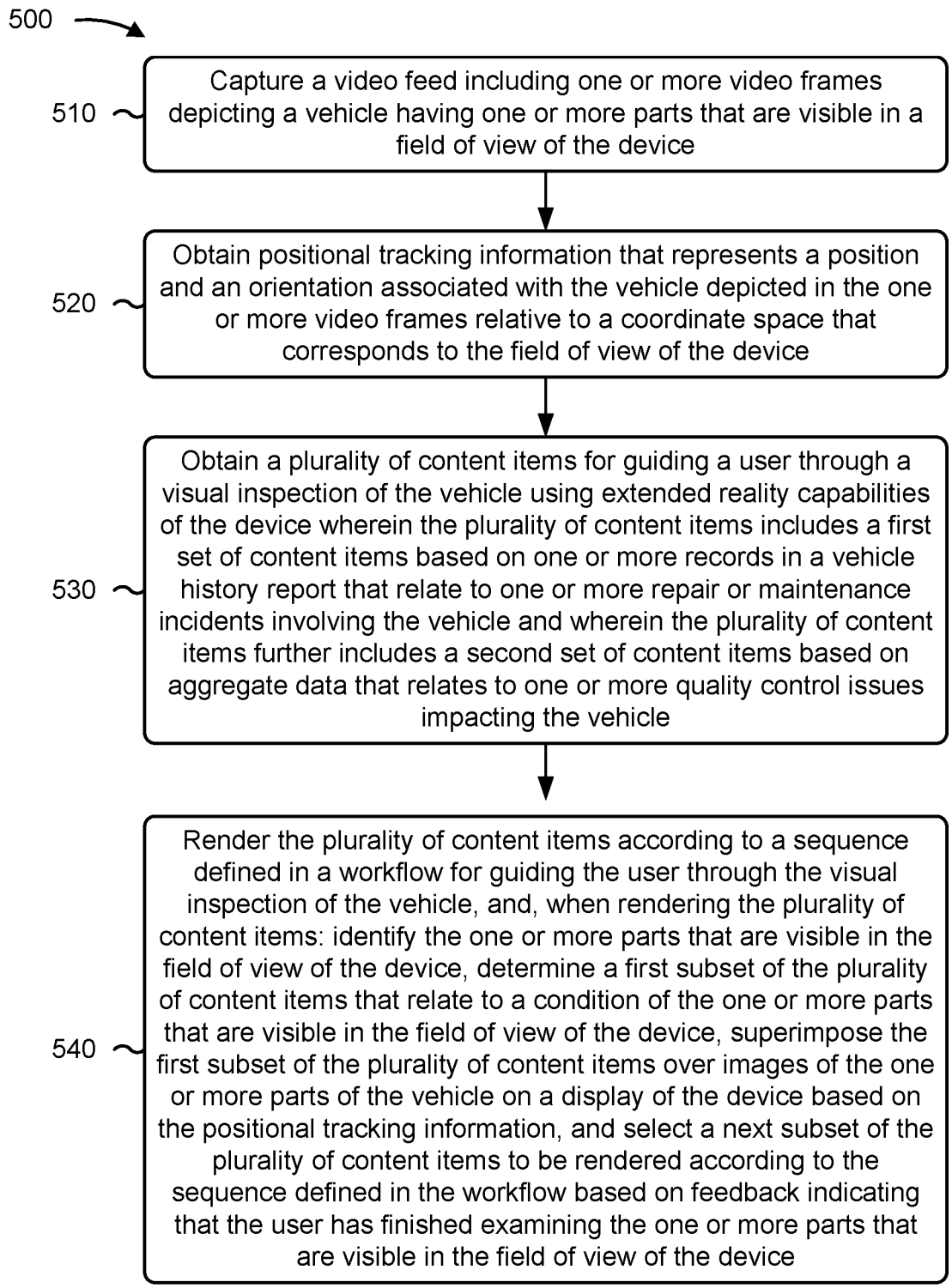

FIG. 5 is a flow chart of an example process 500 for visual inspection support using extended reality. In some implementations, one or more process blocks of FIG. 5 may be performed by extended reality device (e.g., extended reality device 210). In some implementations, one or more process blocks of FIG. 5 may be performed by another device or a group of devices separate from or including the extended reality device, such as a machine-to-machine device (e.g., M2M 220), an inspection support platform (e.g., inspection support platform 230), and/or the like.

As shown in FIG. 5, process 500 may include capturing a video feed including one or more video frames depicting a vehicle having one or more parts that are visible in a field of view of the device (block 510). For example, the extended reality device (e.g., using processor 320, memory 330, storage component 340, input component 350, output component 360, communication interface 370 and/or the like) may capture a video feed including one or more video frames depicting a vehicle having one or more parts that are visible in a field of view of the device, as described above.

As further shown in FIG. 5, process 500 may include obtaining positional tracking information that represents a position and an orientation associated with the vehicle depicted in the one or more video frames relative to a coordinate space that corresponds to the field of view of the device (block 520). For example, the extended reality device (e.g., using processor 320, memory 330, storage component 340, input component 350, output component 360, communication interface 370 and/or the like) may obtain positional tracking information that represents a position and an orientation associated with the vehicle depicted in the one or more video frames relative to a coordinate space that corresponds to the field of view of the device, as described above.

As further shown in FIG. 5, process 500 may include obtaining a plurality of content items for guiding a user through a visual inspection of the vehicle using extended reality capabilities of the device, wherein the plurality of content items includes a first set of content items based on one or more records in a vehicle history report that relate to one or more repair or maintenance incidents involving the vehicle, and wherein the plurality of content items further includes a second set of content items based on aggregate data that relates to one or more quality control issues impacting the vehicle (block 530). For example, the extended reality device (e.g., using processor 320, memory 330, storage component 340, input component 350, output component 360, communication interface 370 and/or the like) may obtain a plurality of content items for guiding a user through a visual inspection of the vehicle using extended reality capabilities of the device, as described above. In some implementations, the plurality of content items includes a first set of content items based on one or more records in a vehicle history report that relate to one or more repair or maintenance incidents involving the vehicle. In some implementations, the plurality of content items further includes a second set of content items based on aggregate data that relates to one or more quality control issues impacting the vehicle.

As further shown in FIG. 5, process 500 may include rendering the plurality of content items according to a sequence defined in a workflow for guiding the user through the visual inspection of the vehicle and, when rendering the plurality of content items, identifying the one or more parts that are visible in the field of view of the device, determining a first subset of the plurality of content items that relate to a condition of the one or more parts that are visible in the field of view of the device, superimposing the first subset of the plurality of content items over images of the one or more parts of the vehicle on a display of the device based on the positional tracking information, and selecting a next subset of the plurality of content items to be rendered according to the sequence defined in the workflow based on feedback indicating that the user has finished examining the one or more parts that are visible in the field of view of the device (block 540). For example, the extended reality device (e.g., using processor 320, memory 330, storage component 340, input component 350, output component 360, communication interface 370 and/or the like) may render the plurality of content items according to a sequence defined in a workflow for guiding the user through the visual inspection of the vehicle to identify the one or more parts that are visible in the field of view of the device and, when rendering the plurality of content items: identify the one or more parts that are visible in the field of view of the device, determine a first subset of the plurality of content items that relate to a condition of the one or more parts that are visible in the field of view of the device, superimpose the first subset of the plurality of content items over images of the one or more parts of the vehicle on a display of the device based on the positional tracking information, and select a next subset of the plurality of content items to be rendered according to the sequence defined in the workflow based on feedback indicating that the user has finished examining the one or more parts that are visible in the field of view of the device, as described above.

Process 500 may include additional implementations, such as any single implementation or any combination of implementations described below and/or in connection with one or more other processes described elsewhere herein.

In a first implementation, the first subset of the plurality of content items includes two-dimensional digital objects to be placed over images of the one or more parts of the vehicle.

In a second implementation, alone or in combination with the first implementation, the plurality of content items includes interactive digital content to guide the user through one or more procedures to troubleshoot one or more problems related to an operational state of the vehicle.

In a third implementation, alone or in combination with one or more of the first and second implementations, the plurality of content items includes interactive digital content to demonstrate one or more features or capabilities associated with the vehicle.

In a fourth implementation, alone or in combination with one or more of the first through third implementations, the first subset of the plurality of content items includes a prompt to examine the condition of the one or more parts that are visible in the field of view of the device, and the next subset of the plurality of content items is selected based on whether the feedback indicates that the condition of the one or more parts is acceptable or unacceptable.

In a fifth implementation, alone or in combination with one or more of the first through fourth implementations, the first subset of the plurality of content items includes a prompt to capture a first image depicting the condition of the one or more parts visible in the field of view of the device, and the next subset of the plurality of content items includes feedback related to the condition of the one or more parts based on a comparison of the first image and one or more additional images that depict the one or more parts in working condition.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
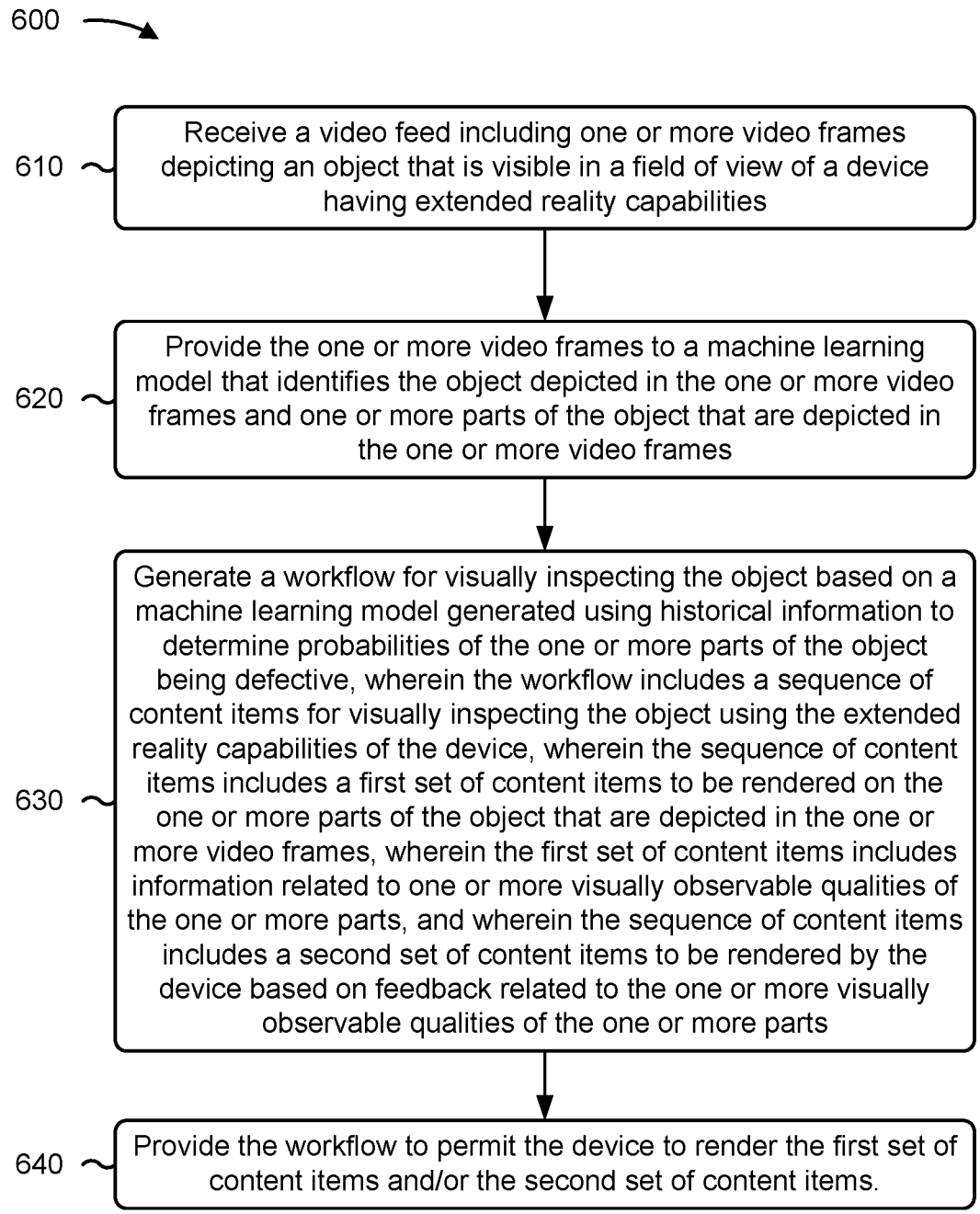

FIG. 6 is a flow chart of an example process 600 for visual inspection support using extended reality. In some implementations, one or more process blocks of FIG. 6 may be performed by an inspection support platform (e.g., inspection support platform 230). In some implementations, one or more process blocks of FIG. 6 may be performed by another device or a group of devices separate from or including the inspection support platform, such as an extended reality device (e.g., extended reality device 210), a machine-to-machine device (e.g., M2M 220), and/or the like.

As shown in FIG. 6, process 600 may include receiving a video feed including one or more video frames depicting an object that is visible in a field of view of a device having extended reality capabilities (block 610). For example, the inspection support platform (e.g., using computing resource 245, processor 320, memory 330, storage component 340, input component 350, output component 360, communication interface 370 and/or the like) may receive a video feed including one or more video frames depicting an object that is visible in a field of view of a device having extended reality capabilities, as described above.

As further shown in FIG. 6, process 600 may include providing the one or more video frames to a machine learning model that identifies the object depicted in the one or more video frames and one or more parts of the object that are depicted in the one or more video frames (block 620). For example, the inspection support platform (e.g., using computing resource 245, processor 320, memory 330, storage component 340, input component 350, output component 360, communication interface 370 and/or the like) may provide the one or more video frames to a machine learning model that identifies the object depicted in the one or more video frames and one or more parts of the object that are depicted in the one or more video frames, as described above.

As further shown in FIG. 6, process 600 may include generating a workflow for visually inspecting the object based on a machine learning model generated using historical information to determine probabilities of the one or more parts of the object being defective, wherein the workflow includes a sequence of content items for visually inspecting the object using the extended reality capabilities of the device, wherein the sequence of content items includes a first set of content items to be rendered on the one or more parts of the object that are depicted in the one or more video frames, wherein the first set of content items includes information related to one or more visually observable qualities of the one or more parts, and wherein the sequence of content items includes a second set of content items to be rendered by the device based on feedback related to the one or more visually observable qualities of the one or more parts (block 630). For example, the inspection support platform (e.g., using computing resource 245, processor 320, memory 330, storage component 340, input component 350, output component 360, communication interface 370 and/or the like) may generate a workflow for visually inspecting the object based on a machine learning model generated using historical information to determine probabilities of the one or more parts of the object being defective, as described above. In some implementations, the workflow includes a sequence of content items for visually inspecting the object using the extended reality capabilities of the device. In some implementations, the sequence of content items includes a first set of content items to be rendered on the one or more parts of the object that are depicted in the one or more video frames. In some implementations, the first set of content items includes information related to one or more visually observable qualities of the one or more parts. In some implementations, the sequence of content items includes a second set of content items to be rendered by the device based on feedback related to the one or more visually observable qualities of the one or more parts.

As further shown in FIG. 6, process 600 may include providing the workflow to permit the device to render the first set of content items and/or the second set of content items (block 640). For example, the inspection support platform (e.g., using computing resource 245, processor 320, memory 330, storage component 340, input component 350, output component 360, communication interface 370 and/or the like) may provide the workflow to permit the device to render the first set of content items and/or the second set of content items, as described above.

Process 600 may include additional implementations, such as any single implementation or any combination of implementations described below and/or in connection with one or more other processes described elsewhere herein.

In a first implementation, process 600 may include selecting the sequence of content items to include in the workflow based on one or more records in a report that relates to a condition of the object and/or aggregate data relating to quality control issues associated with a group of objects of which the object is a member.

In a second implementation, alone or in combination with the first implementation, process 600 may include selecting the sequence of content items to include in the workflow based on one or more of a request for support troubleshooting one or more issues associated with the object, or a request for a virtual demonstration of one or more features or capabilities associated with the object.

In a third implementation, alone or in combination with one or more of the first and second implementations, the first set of content items may include a first prompt to examine the one or more visually observable qualities of the one or more parts, and the second set of content items to be rendered by the device may include a second prompt to examine a condition of a different part of the object based on the feedback indicating that the one or more parts are in an acceptable operating condition.

In a fourth implementation, alone or in combination with one or more of the first through third implementations, process 600 may include receiving, from the device, a first image depicting the one or more visually observable qualities of the one or more parts, and configure the second set of content items to be rendered by the device to indicate a condition of the one or more parts based on a comparison of the first image depicting the visually observable qualities of the one or more parts and a second image depicting the one or more parts in working condition.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   capturing, by a device having extended reality capabilities, a video feed including one or more video frames depicting an object that is visible in a field of view of the device;
   providing, by the device, the one or more video frames to a machine learning model that identifies the object depicted in the one or more video frames and one or more parts of the object that are depicted in the one or more video frames;
   obtaining, by the device, positional tracking information that represents a position and an orientation associated with the object depicted in the one or more video frames relative to a coordinate space that corresponds to the field of view of the device;
   obtaining, by the device, a workflow including a sequence of content items for visually inspecting the object using the extended reality capabilities of the device; and
   rendering, by the device, digital content associated with the workflow using the extended reality capabilities of the device, wherein rendering the digital content includes:
      placing a first set of content items on the one or more parts of the object that are depicted in the one or more video frames based on the positional tracking information,
         wherein the first set of content items includes information related to one or more visually observable qualities of the one or more parts; and
      selecting a next set of content items to be rendered by the device based on the sequence of content items associated with the workflow and feedback related to the one or more visually observable qualities of the one or more parts.

2. The method of claim 1, wherein the first set of content items include two-dimensional overlays to be placed over images of the one or more parts of the object that are depicted in the one or more video frames based on the positional tracking information.

3. The method of claim 1, wherein the sequence of content items included in the workflow is based on one or more records in a report that relates to a condition of the object.

4. The method of claim 1, wherein the sequence of content items included in the workflow is based on aggregate data relating to one or more quality control issues associated with a group of objects of which the object is a member.

5. The method of claim 1, wherein the sequence of content items included in the workflow includes technical support for troubleshooting one or more issues associated with the object.

6. The method of claim 1, wherein the sequence of content items included in the workflow includes a virtual demonstration of one or more features or capabilities associated with the object.

7. The method of claim 1, wherein:
   the first set of content items includes a first prompt to examine the one or more visually observable qualities of the one or more parts, and
   the next set of content items to be rendered by the device includes a second prompt to examine a condition of a different part of the object based on the feedback including a response to the first prompt indicating that the one or more parts are in an acceptable operating condition.

8. The method of claim 1, wherein:
   the first set of content items includes a prompt to capture one or more images depicting the one or more visually observable qualities of the one or more parts, and
   the next set of content items to be rendered by the device indicates a condition of the one or more parts based on the feedback including the one or more images depicting the one or more visually observable qualities of the one or more parts.

9. The method of claim 1, wherein the workflow including the sequence of content items for visually inspecting the object is obtained via a machine-to-machine communication interface between the device and the object.

10. A device, comprising:
   one or more memories; and
   one or more processors, communicatively coupled to the one or more memories, configured to:
      capture a video feed including one or more video frames depicting a vehicle having one or more parts that are visible in a field of view of the device;
      obtain positional tracking information that represents a position and an orientation associated with the vehicle depicted in the one or more video frames relative to a coordinate space that corresponds to the field of view of the device;
      obtain a plurality of content items for guiding a user through a visual inspection of the vehicle using extended reality capabilities of the device,
         wherein the plurality of content items includes a first set of content items based on one or more records in a vehicle history report that relate to one or more repair or maintenance incidents involving the vehicle, and
         wherein the plurality of content items further includes a second set of content items based on aggregate data that relates to one or more quality control issues impacting the vehicle; and
      render the plurality of content items according to a sequence defined in a workflow for guiding the user through the visual inspection of the vehicle, wherein the one or more processors, when rendering the plurality of content items, are further configured to:
- identify the one or more parts that are visible in the field of view of the device;
- determine a first subset of the plurality of content items that relate to a condition of the one or more parts that are visible in the field of view of the device;
- superimpose the first subset of the plurality of content items over images of the one or more parts of the vehicle on a display of the device based on the positional tracking information; and
- select a next subset of the plurality of content items to be rendered according to the sequence defined in the workflow based on feedback indicating that the user has finished examining the one or more parts that are visible in the field of view of the device.

11. The device of claim 10, wherein the first subset of the plurality of content items includes two-dimensional digital objects to be placed over images of the one or more parts of the vehicle.

12. The device of claim 10, wherein the plurality of content items includes interactive digital content to guide the user through one or more procedures to troubleshoot one or more problems related to an operational state of the vehicle.

13. The device of claim 10, wherein the plurality of content items includes interactive digital content to demonstrate one or more features or capabilities associated with the vehicle.

14. The device of claim 10, wherein:
- the first subset of the plurality of content items includes a prompt to examine the condition of the one or more parts that are visible in the field of view of the device, and
- the next subset of the plurality of content items is selected based on whether the feedback indicates that the condition of the one or more parts is acceptable or unacceptable.

15. The device of claim 10, wherein:
- the first subset of the plurality of content items includes a prompt to capture a first image depicting the condition of the one or more parts visible in the field of view of the device, and
- the next subset of the plurality of content items includes feedback related to the condition of the one or more parts based on a comparison of the first image and one or more additional images that depict the one or more parts in working condition.

16. A non-transitory computer-readable medium storing instructions, the instructions comprising:
- one or more instructions that, when executed by one or more processors, cause the one or more processors to:
  - receive a video feed including one or more video frames depicting an object that is visible in a field of view of a device having extended reality capabilities;
  - provide the one or more video frames to a machine learning model that identifies the object depicted in the one or more video frames and one or more parts of the object that are depicted in the one or more video frames;
  - generate a workflow for visually inspecting the object based on a machine learning model generated using historical information to determine probabilities of the one or more parts of the object being defective, wherein the workflow includes a sequence of content items for visually inspecting the object using the extended reality capabilities of the device,
    - wherein the sequence of content items includes a first set of content items to be rendered on the one or more parts of the object that are depicted in the one or more video frames,
      - wherein the first set of content items includes information related to one or more visually observable qualities of the one or more parts, and
    - wherein the sequence of content items includes a second set of content items to be rendered by the device based on feedback related to the one or more visually observable qualities of the one or more parts; and
  - provide the workflow to permit the device to render the first set of content items and/or the second set of content items.

17. The non-transitory computer-readable medium of claim 16, wherein the one or more instructions, when executed by the one or more processors, further cause the one or more processors to:
- select the sequence of content items to include in the workflow based on one or more records in a report that relates to a condition of the object; and
- aggregate data relating to quality control issues associated with a group of objects of which the object is a member.

18. The non-transitory computer-readable medium of claim 16, wherein the one or more instructions, when executed by the one or more processors, further cause the one or more processors to:
- select the sequence of content items to include in the workflow based on one or more of a request for support troubleshooting one or more issues associated with the object, or a request for a virtual demonstration of one or more features or capabilities associated with the object.

19. The non-transitory computer-readable medium of claim 16, wherein:
- the first set of content items includes a first prompt to examine the one or more visually observable qualities of the one or more parts, and
- the second set of content items to be rendered by the device includes a second prompt to examine a condition of a different part of the object based on the feedback indicating that the one or more parts are in an acceptable operating condition.

20. The non-transitory computer-readable medium of claim 16, wherein the one or more instructions, when executed by the one or more processors, further cause the one or more processors to:
- receive, from the device, a first image depicting the one or more visually observable qualities of the one or more parts, and
- configure the second set of content items to be rendered by the device to indicate a condition of the one or more parts based on a comparison of the first image depicting the visually observable qualities of the one or more parts and a second image depicting the one or more parts in working condition.

* * * * *